(12) United States Patent
Chen et al.

(10) Patent No.: US 11,334,955 B2
(45) Date of Patent: May 17, 2022

(54) ENHANCED COMBINED CYCLE

(71) Applicant: Midcontinent Independent System Operator, Inc., Carmel, IN (US)

(72) Inventors: Yonghong Chen, Zionsville, IN (US); Congcong Wang, Carmel, IN (US); Charles William Hansen, Carmel, IN (US); Jason Coy Howard, Russiaville, IN (US); Kimberly Lynn Sperry, Carmel, IN (US); Kevin Andrew Vannoy, Carmel, IN (US); Chunheng Wang, Carmel, IN (US); Fengyu Wang, Carmel, IN (US)

(73) Assignee: Midcontinent Independent System Operator, Inc., Carmel, IN (US)

( * ) Notice: Subject to any disclaimer, the term of this patent is extended or adjusted under 35 U.S.C. 154(b) by 0 days.

(21) Appl. No.: 16/438,895

(22) Filed: Jun. 12, 2019

(65) Prior Publication Data

US 2020/0020049 A1 Jan. 16, 2020

Related U.S. Application Data

(60) Provisional application No. 62/696,604, filed on Jul. 11, 2018.

(51) Int. Cl.
 *G06Q 50/06* (2012.01)
 *G06Q 10/06* (2012.01)

(52) U.S. Cl.
 CPC ....... *G06Q 50/06* (2013.01); *G06Q 10/06315* (2013.01)

(58) Field of Classification Search
 None
 See application file for complete search history.

(56) References Cited

U.S. PATENT DOCUMENTS

| | | | |
|---|---|---|---|
| 9,286,646 B1 * | 3/2016 | Hoff | G06Q 50/06 |
| 2010/0332373 A1 * | 12/2010 | Crabtree | G06Q 40/04 709/224 |
| 2015/0184550 A1 * | 7/2015 | Wichmann | F01K 13/02 700/287 |
| 2017/0358041 A1 * | 12/2017 | Forbes, Jr | H02J 13/00028 |

* cited by examiner

*Primary Examiner* — Mohammad Ali
*Assistant Examiner* — Saad M Kabir
(74) *Attorney, Agent, or Firm* — BakerHostetler

(57) ABSTRACT

A method for operating a combined-cycle electrical power grid by: accepting, from combined cycle power generation participants, combined cycle offers for valid combined cycle configurations, each including identification of power generator type(s) for the configuration and the offers including at least three levels of parameter information pertaining for the valid combined cycle configurations, the three levels including, (a) resource level parameters that describe transition information between the valid combined cycle configurations, (b) configuration level parameters that describe operating parameters for each valid configuration; and (c) component level parameters that describe operating parameters for specific power generator components included in a valid configuration; selecting commitments from the combined cycle offers based upon the resource level parameters, the configuration level parameters and the component level parameters; and controlling dispatch of electricity based upon the commitments.

20 Claims, 37 Drawing Sheets

CONVENTIONAL CC START/STOP

| UNIT NAME | ACTION | ACTION TIME |
|---|---|---|
| AggCC #1 | START | 05:00 |
| STEAM #2 | START | 13:00 |
| COAL #3 | STOP | 21:00 |
| AggCC #1 | STOP | 22:00 |

ECC START/STOP/TRANSITION

| UNIT NAME | ACTION | ACTION TIME |
|---|---|---|
| ECC #1-1x1 | START | 05:00 |
| ECC #1-1x1 | TRANS OUT* | 08:00 |
| ECC #1-2x1 | TRANS IN | 08:00 |
| STEAM #2 | START | 13:00 |
| ECC #1-2x1 | TRANS OUT | 15:00 |
| ECC #1-2x1DB | TRANS IN | 15:00 |
| ECC #1-2x1DB | TRANS OUT | 19:00 |
| ECC #1-2x1 | TRANS IN | 19:00 |
| COAL #3 | STOP | 21:00 |
| ECC #1-2x1 | STOP | 22:00 |

FIG. 3-2

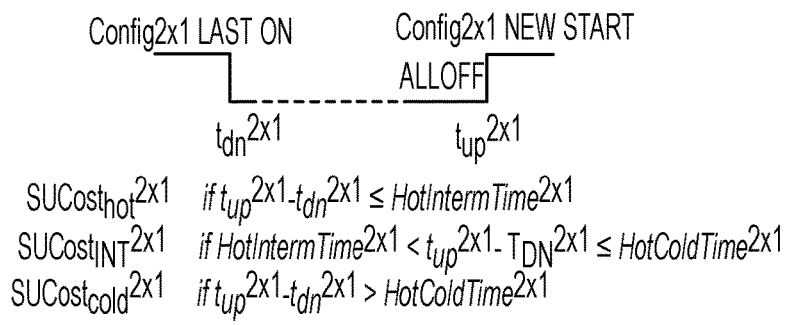

$SUCost_{hot}^{2x1}$ if $t_{up}^{2x1} - t_{dn}^{2x1} \leq HotIntermTime^{2x1}$
$SUCost_{INT}^{2x1}$ if $HotIntermTime^{2x1} < t_{up}^{2x1} - T_{DN}^{2x1} \leq HotColdTime^{2x1}$
$SUCost_{cold}^{2x1}$ if $t_{up}^{2x1} - t_{dn}^{2x1} > HotColdTime^{2x1}$ WHEN THE STATE IS DETERMINED, CONSTRAINTS CAN BE ENFORCED TO ENSURE SUFFICIENT TIME IS ALLOWED TO NOTIFY AND START THE CONFIGURATION AS REQUIRED BY THE STATE, E.G., FOR A HOT STATE AS BELOW.

LAC CASE SOLVED AT $t_0$ SUGGESTS STARTING 2x1 EARLIER AT $t_1$

$t_1 - t_0 \geq HotStartupTime^{2x1} + HotNotificationTime^{2x1}$

FIG. 4-1

EXISTING COMMITMENT PLAN

| | 2x1 | 2x1 DB | |
|---|---|---|---|
| ALLOFF | 0 | 0 | |
| 1x1 | 0 | 0 | STILL FREEZE OTHER COMMITMENTS |
| 1x1-DB | 0 | 0 | |
| 2x1 | 1 | 0 | UNFREEZE PREVIOUS COMMITMENT OF ELIGIBLE |
| 2x1-DB | 0 | 1 | CONFIGURATIONS FOR LAC TO TRANSITION DOWN |
| 3x1 | 0 | 0 | UNFREEZE PREVIOUS COMMITMENT |
| 3x1-DB | 0 | 0 | FOR LAC TO TRANSITION UP |

| | |
|---|---|
| ▨ | ELIGIBLE CONFIGURATIONS FOR TRANSITION UP |
| ▭ | CURRENT CONFIGURATION |
| ▦ | ELIGIBLE CONFIGURATIONS FOR TRANSITION DOWN |

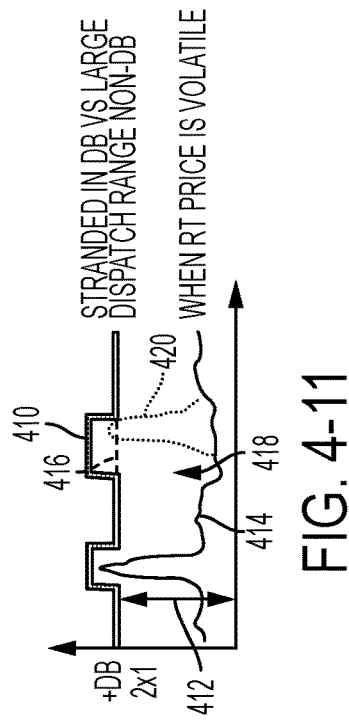

FIG. 4-11

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
|---|---|---|---|---|---|---|---|---|---|---|---|---|---|---|---|---|---|---|---|---|---|---|---|---|---|
| | | | | | | 1st DA COMMIT | | | | | RT HAS ONE COMMITMENT PERIOD WITH TRANSITIONS | | | | | | 2nd DA COMMIT | | | | | | | | |
| DA RSG | | | | | | | | | | | | | | | | | | | | | | | | | DA COMMITMENT PERIOD |
| RT RSG: STARTUP AND TRANSITION* | | | | | | | | | | | | | | | | | | | | | | | | | CONTIGUOUS DA AND RT COMMITMENT PERIODS (COMMITMENT BLOCK) |
| RT RSG: NO-LOAD, ENERGY, OPERATING RESERVES | | | | | | | | | | | | | | | | | | | | | | | | | RT MISO COMMITMENT PERIODS |
| DAMAP | | | | | | | | | | | | | | | | | | | | | | | | | HOURS IN DA COMMITMENT PERIODS |
| RTORSGP | | | | | | | | | | | | | | | | | | | | | | | | | COMMITTED HOURS NOT IN RT RSG |

TIME PERIODS FOR ECC MAKE WHOLE PAYMENTS

FIG. 5-1

| | CLEARED MW | OFFER $ | PRICE | COST | REVENUE | MWP |
|---|---|---|---|---|---|---|
| DA ENERGY | 200 | 20 | 40 | 4000 | 8000 | 4000 |
| DA REG | 35 | 10 | 11 | 350 | 385 | 35 |
| DA SPIN | 10 | 1 | 2 | 10 | 20 | 10 |
| | | | | | | |
| | | | 450*25-200*20 | | (450-200)*26 | |
| RT ENERGY | 450 | 25 | 26 | -7250 | 6500 | -750 |
| RT REG | 0 | 10 | 11 | -350 | -385 | -35 |
| RT SPIN | 35 | 1 | 2 | 25 | 50 | 25 |
| RT MWP | | | | | | -760 |

FIG. 5-9

|  | CLEARED MW | OFFER $ | PRICE | COST | REVENUE | MWP |
|---|---|---|---|---|---|---|
| DA ENERGY | 200 | 20 | 22 | 4000 | 4400 | 400 |
| DA REG | 35 | 10 | 11 | 350 | 385 | 35 |
| DA SPIN | 10 | 1 | 2 | 10 | 20 | 10 |
|  |  |  | 0*10-35*10 |  | (0-35)*11 |  |
| RT ENERGY | 550 | 25 | 26 | 9750 | 9100 | -650 |
| RT REG | 0 | 10 | 11 | -350 | -385 | -35 |
| RT SPIN | 0 | 1 | 2 | -10 | -20 | -10 |
| RT MWP |  |  |  |  |  | -695 |

FIG. 5-10

| INTERVAL ENDING | 6:05 | 6:10 | 6:15 | 6:20 | 6:25 | 6:30 | 6:35 | 6:40 | 6:45 | 6:50 | 6:55 |
|---|---|---|---|---|---|---|---|---|---|---|---|
| DA CONFIG | 1x1 | 1x1 | 1x1 | 1x1 | 1x1 | 1x1 | 1x1 | 1x1 | 1x1 | 1x1 | 1x1 |
| DA ENERGY MW | 200 | 200 | 200 | 200 | 200 | 200 | 200 | 200 | 200 | 200 | 200 |
| DA REG MW | 35 | 35 | 35 | 35 | 35 | 35 | 35 | 35 | 35 | 35 | 35 |
| DA SPIN MW | 10 | 10 | 10 | 10 | 10 | 10 | 10 | 10 | 10 | 10 | 10 |
| RT CONFIG | 2x1 | 2x1 | 2x1 | 2x1 | 2x1 | 2x1 | 2x1 | 2x1 | 2x1 | 2x1 | 2x1 |
| RT TRANSITION | NO | NO | NO | NO | NO | NO | YES | YES | YES | YES | YES |
| RT ENERGY BasePt | 450 | 450 | 450 | 450 | 450 | 450 | 525 | 525 | 525 | 550 | 550 |
| RT ENERGY LMP | 0 | 0 | 0 | 0 | 0 | 0 | 0 | 0 | 0 | 0 | 0 |
| RT REG MW | 35 | 35 | 35 | 35 | 35 | 35 | 0 | 0 | 0 | 0 | 0 |
| RT SPIN MW | 26 | 26 | 26 | 26 | 26 | 26 | 26 | 26 | 26 | 26 | 26 |
| RT REG MCP | 11 | 11 | 11 | 11 | 11 | 11 | 11 | 11 | 11 | 11 | 11 |
| RT SPIN MCP | 2 | 2 | 2 | 2 | 2 | 2 | 2 | 2 | 2 | 2 | 2 |
| RT_MWP_EN | -750 | -750 | -750 | -750 | -750 | -750 | -675 | -675 | -675 | -650 | -650 |
| RT_MWP_REG | -35 | -35 | -35 | -35 | -35 | -35 | -35 | -35 | -35 | -35 | -35 |
| RT_MWP_SPIN | 25 | 25 | 25 | 25 | 25 | 25 | -10 | -10 | -10 | -10 | -10 |
| RT_MWP | -760 | -760 | -760 | -760 | -760 | -760 | -720 | -720 | -720 | -695 | -695 |

FIG. 5-11

| INTERVAL ENDING | 4:05 | 4:10 | 4:15 | 4:20 | 4:25 | 4:30 | 4:35 | 4:40 | 4:45 | 4:50 | 4:55 | 5:00 |
|---|---|---|---|---|---|---|---|---|---|---|---|---|
| DA Config | 1x1 | 1x1 | 1x1 | 1x1 | 1x1 | 1x1 | 1x1 | 1x1 | 1x1 | 1x1 | 1x1 | 1x1 |
| DA Energy MW | 200 | 200 | 200 | 200 | 200 | 200 | 200 | 200 | 200 | 200 | 200 | 200 |
| DA Reg MW | 35 | 35 | 35 | 35 | 35 | 35 | 35 | 35 | 35 | 35 | 35 | 35 |
| DA Spin MW | 10 | 10 | 10 | 10 | 10 | 10 | 10 | 10 | 10 | 10 | 10 | 10 |
| RT Config | 1x1 | 1x1 | 1x1 | 1x1 | 1x1 | 1x1 | 1x1 | 1x1 | 1x1 | 1x1 | 1x1 | 1x1 |
| RT Transition | NO | NO | NO | NO | NO | NO | YES | YES | YES | YES | YES | YES |
| RT Energy BasePt | 200 | 200 | 200 | 200 | 200 | 200 | 245 | 245 | 286 | 327 | 368 | 409 |
| RT Reg MW | 0 | 0 | 0 | 0 | 0 | 0 | 0 | 0 | 0 | 0 | 0 | 0 |
| RT Spin MW | 10 | 10 | 10 | 10 | 10 | 10 | 0 | 0 | 0 | 0 | 0 | 0 |
| RT Energy LMP | 21 | 21 | 21 | 21 | 21 | 21 | 21 | 21 | 21 | 21 | 21 | 21 |
| RT Reg MCP | 11 | 11 | 11 | 11 | 11 | 11 | 11 | 11 | 11 | 11 | 11 | 11 |
| RT SPIN MCP | 2 | 2 | 2 | 2 | 2 | 2 | 2 | 2 | 2 | 2 | 2 | 2 |
| RT_MWP_EN | 0 | 0 | 0 | 0 | 0 | 0 | 45 | 45 | 86 | 127 | 168 | 209 |
| RT_MWP_REG | -35 | -35 | -35 | -35 | -35 | -35 | -35 | -35 | -35 | -35 | -35 | -35 |
| RT_MWP_SPIN | 0 | 0 | 0 | 0 | 0 | 0 | -10 | -10 | -10 | -10 | -10 | -10 |
| RT_MWP | -35 | -35 | -35 | -35 | -35 | -35 | 0 | 0 | 41 | 82 | 123 | 164 |

FIG. 5-12

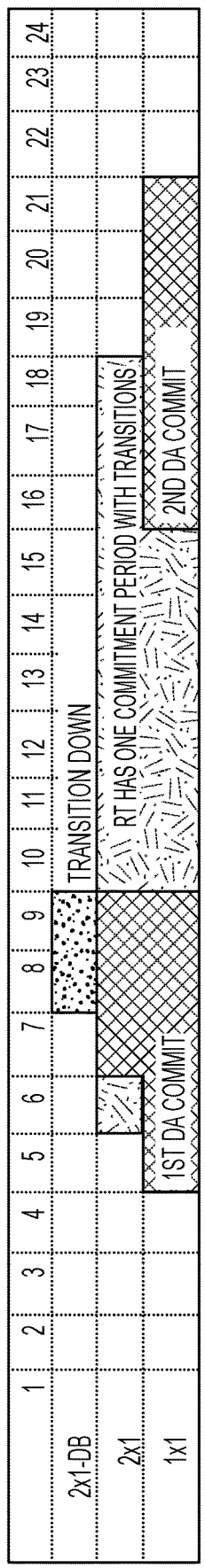
FIG. 5.13

| INTERVAL ENDING | 7:05 | 7:10 | 7:15 | 7:20 | 7:25 | 7:30 | 7:35 | 7:40 | 7:45 | 7:50 | 7:55 | 8:00 | 8:05 | 8:10 | 8:15 |
|---|---|---|---|---|---|---|---|---|---|---|---|---|---|---|---|
| DA CONFIG | 2x1DB | 2x1DB | 2x1DB | 2x1DB | 2x1DB | 2x1DB | 2x1DB | 2x1DB | 2x1DB | 2x1DB | 2x1DB | 2x1DB | 2x1DB | 2x1DB | 2x1DB |
| DA ENERGY MW | 565 | 565 | 565 | 565 | 565 | 565 | 565 | 565 | 565 | 565 | 565 | 565 | 565 | 565 | 465 |
| DA REG MW | 0 | 0 | 0 | 0 | 0 | 0 | 0 | 0 | 0 | 0 | 0 | 0 | 0 | 0 | 0 |
| DA SPIN MW | 0 | 0 | 0 | 0 | 0 | 0 | 0 | 0 | 0 | 0 | 0 | 0 | 0 | 0 | 0 |
| RT CONFIG | 2x1 | 2x1 | 2x1 | 2x1 | 2x1 | 2x1 | 2x1 | 2x1 | 2x1 | 2x1 | 2x1 | 2x1 | 2x1 | 2x1 | 2x1 |
| RT TRANSITION(PLAN) | NO | NO | NO | NO | NO | NO | NO | NO | NO | NO | NO | NO | NO | NO | NO |
| RT TRANSITION(CCP) | NO | NO | NO | NO | NO | NO | NO | NO | NO | NO | NO | NO | NO | NO | NO |
| RT ENERGY MW | 450 | 450 | 450 | 450 | 450 | 450 | 450 | 450 | 450 | 450 | 450 | 450 | 450 | 450 | 450 |
| RT REG MW | 40 | 40 | 40 | 40 | 40 | 40 | 40 | 40 | 40 | 40 | 40 | 40 | 40 | 40 | 40 |
| RT SPIN MW | 35 | 35 | 35 | 35 | 35 | 35 | 35 | 35 | 35 | 35 | 35 | 35 | 35 | 35 | 35 |
| RT ENERGY LMP | 26 | 26 | 26 | 26 | 26 | 26 | 26 | 26 | 26 | 26 | 26 | 26 | 26 | 60 | 60 |
| RT REG MCP | 11 | 11 | 11 | 11 | 11 | 11 | 11 | 11 | 11 | 11 | 11 | 11 | 11 | 11 | 11 |
| RT SPIN MCP | 2 | 2 | 2 | 2 | 2 | 2 | 2 | 2 | 2 | 2 | 2 | 2 | 2 | 2 | 2 |
| RT_MWP_EN | 2710 | 2710 | 2710 | 2710 | 2710 | 2710 | 2710 | 2710 | 2710 | 2710 | 2710 | 2710 | 2710 | -1200 | -1200 |
| RT_MWP_REG | 40 | 40 | 40 | 40 | 40 | 40 | 40 | 40 | 40 | 40 | 40 | 40 | 40 | 40 | 40 |
| RT_MWP_SPIN | 35 | 35 | 35 | 35 | 35 | 35 | 35 | 35 | 35 | 35 | 35 | 35 | 35 | 35 | 35 |
| RT_MWP | 2785 | 2785 | 2785 | 2785 | 2785 | 2785 | 2785 | 2785 | 2785 | 2785 | 2785 | 2785 | 2785 | -1125 | -1125 |

REPRESENTATIVE INTERVAL OF TRANSITION DOWN WHEN RT PRICES DOES NOT SUPPORT DB

INTERVAL OF VOLATILE RT PRICES THAT INCUR HIGH BUYBACK COST

FIG. 5-14

INTERVAL 7:50 - TRANSITION DOWN WITH LOW RT PRICE

| | CLEAR MW | OFFER $ | PRICE | RSG COST | REVENUE | MWP |
|---|---|---|---|---|---|---|
| DA ENERGY | 565 | 30 | 40 | 16950 | 22600 | 5650 |
| DA REG | 0 | 10 | 11 | 0 | 0 | 0 |
| DA SPIN | 0 | 1 | 2 | 0 | 0 | 0 |
| | | | 450*25-565*30 | | BUYBACK COST 450-565*26 | |
| RT ENERGY | 450 | 25 | 20 | -5700 | -2990 | 2710 |
| RT REG | 40 | 10 | 26 | 400 | 440 | 40 |
| RT SPIN | 35 | 1 | 2 | 35 | 70 | 35 |
| RT MWP | | | | | | 2785 |

INTERVAL 8:10 - TRANSITION DOWN WITH HIGH RT PRICE

| | CLEAR MW | OFFER $ | RT PRICE | RSG COST | REVENUE | RT_MWP |
|---|---|---|---|---|---|---|
| DA ENERGY | 565 | 30 | 40 | 16950 | 22600 | 5650 |
| DA REG | 0 | 10 | 11 | 0 | 0 | 0 |
| DA SPIN | 0 | 1 | 2 | 0 | 0 | 0 |
| | | | 450*20-565*30 | | 450-565*60 | |
| RT ENERGY | 450 | 25 | 60 | -5700 | -6900 | -1200 |
| RT REG | 40 | 10 | 11 | 400 | 440 | 40 |
| RT SPIN | 35 | 1 | 2 | 35 | 70 | 35 |
| DA RT MWP | | | | | | -1125 |

FIG. 5-15

| INTERVAL ENDING | 5:05 | 5:10 | 515 | 5:20 | 5:25 | 5:30 | 5:35 | 5:40 |
|---|---|---|---|---|---|---|---|---|
| DA CONFIG | 1x1 | 1x1 | 1x1 | 1x1 | 1x1 | 1x1 | 1x1 | 1x1 |
| DA ENERGY MW | 200 | 200 | 200 | 200 | 200 | 200 | 200 | 200 |
| DA REG MW | 0 | 0 | 0 | 0 | 0 | 0 | 0 | 0 |
| DA SPIN MW | 0 | 0 | 0 | 0 | 0 | 0 | 0 | 0 |
| RT CONFIG | 2x1 | 2x1 | 2x1 | 2x1 | 2x1 | 2x1 | 2x1 | 2x1 |
| RT TRANSITION (PLAN) | NO | NO | NO | NO | NO | NO | NO | NO |
| RT TRANSITION (ICCP) | NO | NO | NO | NO | NO | NO | NO | NO |
| RT ENERGY MW | 185 | 185 | 185 | 185 | 185 | 185 | 185 | 230 |
| RT REG MW | 40 | 40 | 40 | 40 | 40 | 40 | 40 | 40 |
| RT SPIN MW | 35 | 35 | 35 | 35 | 35 | 35 | 35 | 35 |
| RT ENERGY LMP | 24 | 24 | 24 | 24 | 24 | 24 | 24 | 26 |
| RT REG MCP | 11 | 11 | 11 | 11 | 11 | 11 | 11 | 11 |
| RT SPIN MCP | 2 | 2 | 2 | 2 | 2 | 2 | 2 | 2 |
| RT_MWP_EN | -985 | -985 | -985 | -985 | -985 | -985 | -985 | -970 |
| RT_MWP_REG | 40 | 40 | 40 | 40 | 40 | 40 | 40 | 40 |
| RT_MWP_SPIN | 35 | 35 | 35 | 35 | 35 | 35 | 35 | 35 |
| RT_MWP | -910 | -910 | -910 | -910 | -910 | -910 | -910 | -895 |

INTERVAL WITHOUT TRANSITION DOWN BUT WITH ENERGY BUYBACK

FIG. 5-16

INTERVAL 5:05-TRANSITION UP BUT ENERGY DISPATCHED DOWN TO PROVIDE OTHER PRODUCTS

| | CLEAR MW | OFFER $ | PRICE | RSG COST | REVENUE | MWP |
|---|---|---|---|---|---|---|
| DA ENERGY | 200 | 20 | 40 | 4000 | 8000 | 4000 |
| DA REG | 0 | 10 | 11 | 0 | 0 | 0 |
| DA SPIN | 0 | 1 | 2 | 0 | 0 | 0 |
| | | | 185*25-200*20 | | 185*25-200*24 | |
| RT ENERGY | 185 | 25 | 24 | 625 | -360 | -985 |
| RT REG | 40 | 10 | 11 | 400 | 440 | 40 |
| RT SPIN | 35 | 1 | 2 | 35 | 70 | 35 |
| RT MWP | | | | | | -910 |

FIG. 5-17

| | HOUR | 12 | 13 | 14 | 15 | 16 | 17 | 18 | 19 | 20 | 21 | 22 | 23 | 24 | |
|---|---|---|---|---|---|---|---|---|---|---|---|---|---|---|---|
| DA SELF-COMMIT | 2x1 | | | | | DA MR | | | | | | | | | |
| | 1x1 | | | | | | | | | | | | | | |
| STARTUP/TRANSITION OFFER | | | | | | 30k | | | | | | | | | 30000 |
| DA SCHEDULE | 2x1 | | | | | DA MR | | | | DA COMMIT | | | | | |
| | 1x1 | | | DA COMMIT | | | | | | | | | | | |
| STARTUP/TRANSITION OFFER | | | | 17k | | 15.5k | | | | 0.1k | | | | | 32600 |
| STARTUP/TRANSITION FOR DA RSG | | | | | | | | | | | | | | | 2600 |

FIG. 5-18

| 12 | 13 | 14 | 15 | 16 | 17 | 18 | 19 | 20 | 21 |
|---|---|---|---|---|---|---|---|---|---|
| | | DA COMMIT | | DA MR | | | | | |

| HOUR | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | |
|---|---|---|---|---|---|---|---|---|---|---|---|---|---|---|---|---|---|---|---|---|---|---|---|---|---|
| RT MUST-RUN | | | | | | | | | | | | | | | | | | | | | | | | | |
| 2x1 | | | | | RT MR | | | | | | | | | RT MR | DA MR | | | | | | | | | | |
| 1x1 | | | | | | | | | | | | | | | | DA COMMIT | | | | | | | | | |
| STARTUP/TRANSITION OFFER | | | | | 30k | | | | | | | | | | 30k | | | | | 0.1k | | | | | 60100 |
| RT SCHEDULE | | | | | | | | | | | | | | | | | | | | | | | | | |
| 2x1 | | | | | RT MR | | | | | | | | | RT MR | DA MR | | | | | | | | | | |
| 1x1 | | | RT COMMIT | | | | | | | | RT COMMIT | | | DA COMMIT | | | | | | | | | | | |
| STARTUP/TRANSITION OFFER | | 17k | | | 15.5k | | | | | | | 17k | | 15.5k | | | | | | 0.1k | | | | | 65100 |
| STARTUP/TRANSITION FOR RT RSG | | | | | | | | | | | | | | | | | | | | | | | | | (5000) |

FIG. 5-20

| 12 | 13 | 14 | 15 | 16 | 17 | 18 | 19 | 20 | 21 |
|----|----|----|----|----|----|----|----|----|----|
|    |    | RT COMMIT || RT MR |||||    |    |

| COMPENSATE THE SMALLER AMOUNT IF MP CHANGE OFFERS | DA OFFER CURVE | DA PROFIT - RT PROFIT |
|---|---|---|
| | RT OFFER CURVE | DA PROFIT - RT PROFIT |

MAKE UP THE DIFFERENCE BETWEEN DA PROFIT AND RT PROFIT

FIG. 5-22

| DA_MW OF DA_Config | DA_MW OF RT_Config |
|---|---|
| DA_Offer CURVE | DA_Offer CURVE |
| RT_as committed_Offer CURVE | RT_as committed_Offer CURVE |
| RT_as dispatched Offer CURVE | RT_as dispatched Offer CURVE |

FIG. 5-23

| CONFIGURATION | COLD | INTER | HOT |
|---|---|---|---|
| START-UP TIME(h) | 5-9 | 3-5 | 2 |

NOTIFICATION TIME: TYPICALLY 0.5-1 HOUR

| INDIVIDUAL | CT | ST | DB |
|---|---|---|---|
| MIN RUN TIME (h) | 2-4 | 4-5 | 1-2 |

FIG. 6-1

ENHANCED COMBINED CYCLE

CROSS REFERENCE TO RELATED APPLICATIONS

The present application claims priority to U.S. Provisional Application, Ser. No. 62/696,604, filed on Jul. 11, 2018, the entire disclosure of which is incorporated herein by reference.

BACKGROUND

The current disclosure relates generally to electric power grids, and more particularly to methods, apparatuses and systems for controlling and operating such electric power grids utilizing combined cycle resources.

Combined cycle resources have many advantageous attributes including lower levelized costs, higher efficiency, lower Carbon Dioxide emissions, better operational flexibility and faster response times. The combined cycle owners have restricted capability to fully reflect the variations in their costs and operating characteristics for different operating configurations in market unit offers under the existing simplified models, and the resulting commitment and dispatch are limited in their use of the operational advantages of combined cycle resources.

SUMMARY

The exemplary models of the current disclosure address requirements to reflect operational characteristics utilizing Configurations, Components, and Transitions to better model Combined Cycle Gas Turbine ("CCGT") capabilities and achieve production cost savings.

More specifically, under the exemplary Enhanced Combined Cycle ("ECC") model according to the current disclosure, a Market Participant ("MP") can offer multiple combined cycle configurations and specify the offer cost and operating parameters for each configuration and the associated component units. The configuration-based offers of the exemplary model more accurately capture the underlying cost structure and operating characteristics such as minimum/maximum output, and ramp rates which can vary by configuration. Instead of traditional on/off commitment decisions of the whole resource, the exemplary model will optimize commitments and transitions among multiple configurations.

The exemplary optimized commitment of configurations will alleviate some key operational challenges that combined cycle resource owners face in the prior art. For example, prior art decisions to operate duct burners ("DB"), a component of most combined cycle resources, requires owners to assess operating costs, loss of flexibility, near term market conditions, and assume financial and operational risk. The exemplary model will be able to weigh these factors against information of the overall system needs and conditions and optimize when to operate configurations using DBs. Modeling transition costs, operating characteristics and scheduling transitions through market commitment and dispatch will help better manage risk and reduce inefficiencies introduced in offers and unit restrictions.

The exemplary ECC design according to the current disclosure also addresses Market Settlement rules including revenue sufficiency and marginal assurance make-whole payment calculations. In the prior art, settlement calculations align with daily owner decisions to offer as aggregate or individual units. With the exemplary enhancements according to the current disclosure, settlement rules will account for offered and cleared configurations and transitions between configurations at the direction of grid controller or at the discretion of the resource owner. Make-whole payment calculation changes will capture new features of exemplary ECC resources according to the current disclosure, including offers that vary by configuration, the introduction of transition costs, and Day-Ahead ("DA") and Real-Time ("RT") overlapping commitments due to Real-Time changes in the committed configuration.

Other areas impacted by the exemplary ECC model according to the current disclosure, include Registration, Telemetry and Communication, and Pricing.

Registration—MPs may continue using the conventional aggregate or individual unit model or register to enable ECC modeling. In some embodiments, certain aspects of ECC modeling, such as configuration and transition matrices, may be restricted to quarterly Network and Commercial model change cycles.

Telemetry and Communication—Additional modeling and implementation of new telemetry data points may be required for resources utilizing ECC modeling. In some embodiments, real-time communications of configuration and transition status may be required to enable market clearing and to support operator situational awareness.

Pricing—The Extended Locational Marginal Price ("ELMP") framework will be used to price the exemplary ECC model.

An aspect of the current disclosure is to provide a method for reliably and efficiently operating a electrical power grid system with combined-cycle resources that includes the steps of: accepting, from a plurality of combined cycle power generation participants, combined cycle offers for a set of valid combined cycle configurations, each combined cycle configuration in the set including (a) identification of one or more power generator components for the configuration, (b) power generation capacity for each of the one or more power generator components identified, (c) operating characteristics for the configuration, and (d) cost for the configuration; selecting commitments from the combined cycle offers based upon, at least in part, the (c) operating characteristics and (d) cost for each offered configuration; and controlling dispatch of electricity on the electrical power grid based upon the commitments. In a more detailed embodiment, the set of valid combined cycle configuration also includes an all-off configuration.

Alternatively or in addition, the combined cycle offers further include physical component identifications associated with the power generator component identifications and the method further includes tracking component on and off times to enforce minimum up time, minimum down time and maximum run time constraints.

Alternatively or in addition, the set of valid combined cycle configurations includes one or more configurations with (e) indication of the presence of a DB to increase the power generation capacity of the configuration.

Alternatively or in addition, the combined cycle offers include resource level parameters that provide information pertaining to potential transitions between valid combined cycle configurations.

Alternatively or in addition, the resource level parameters include transition validity indicators between respective pairs of valid combined cycle configurations, the transition validity indicators indicating whether a transition between the pair of valid combined cycle configurations is valid or not.

Alternatively or in addition, the resource level parameters further include transition time, transition notification time and transition cost information for each respective pair of valid transitions.

Alternatively or in addition, the method further includes controlling transitioning between configurations based, at least in part, from information provided by the resource level parameters.

Alternatively or in addition, the method further includes controlling transitioning between the configurations based upon the RT market information.

In another aspect of the current disclosure, a method for operating a combined-cycle electrical power grid system includes the step of: accepting, from a plurality of combined cycle power generation participants, combined cycle offers for a set of valid combined cycle configurations, each combined cycle configuration in the set including identification of one or more power generator types for the configuration and the offers including at least three levels of parameter information pertaining for the valid combined cycle configurations, the three levels of parameter information including, (a) resource level parameters that describe transition information between the valid combined cycle configurations, (b) configuration level parameters that describe operating parameters for each valid combined cycle configuration in the set; and (c) component level parameters that describe operating parameters for specific power generator components included in one or more of the valid combined cycle configurations; selecting commitments from the combined cycle offers based upon, at least in part, the resource level parameters, the configuration level parameters and the component level parameters; and controlling dispatch of electricity on the electrical power grid based upon the commitments. In a more detailed embodiment, the resource level parameters include transition validity indicators between respective pairs of valid combined cycle configurations, the transition validity indicators indicating whether a transition between the pair of valid combined cycle configurations is valid or not. In a further detailed embodiment, the resource level parameters further include transition time, transition notification time and transition cost information for each respective pair of valid transitions. In a further detailed embodiment, the method further includes controlling transitioning between configurations based, at least in part, from information provided by the resource level parameters. In a further detailed embodiment, the method further includes controlling transitioning between the configurations based upon RT market information.

Alternatively or in addition, the method further includes controlling transitioning between the configurations based, at least in part, upon the resource level parameters and upon RT market information.

Alternatively or in addition, the selecting and controlling steps do not specify specific power generator components, thereby allowing combined cycle power generation participants to select specific power generator components for the valid combined cycle configurations.

Alternatively or in addition, the selecting and controlling steps do not specify specific power generator components, thereby allowing combined cycle power generation participants to select specific power generator components for the valid combined cycle configurations.

Alternatively or in addition, the method further includes the step of receiving telemetry information from combined cycle power generation participants, the telemetry information including (i) information indicating the current combined cycle configuration in which the combined cycle power generation participant is operating, and (ii) information pertaining to whether the combined cycle power generation participant is transitioning between combined cycle configurations.

Alternatively or in addition, the method further includes arranging settlement payment to the combined cycle power generation participants, wherein the settlement payment takes into account the combined cycle configurations in which the combined cycle power generation participants were operating in a given time period. In a more detailed embodiment, the settlement payment further takes into account RT changes in committed combined cycle configurations for the combined cycle power generation participants. In a further detailed embodiment, the settlement payment further takes into account DA and RT commitments due to RT changes in the committed combined cycle configurations. In yet a further detailed embodiment, the settlement payment further takes into account the transition costs between combined cycle configurations.

These and other aspects and objects of the current disclosure will be apparent from the following detailed description, the attached figures and the appended claims.

BRIEF DESCRIPTION OF THE DRAWINGS

FIG. 2-1 is a block diagram illustration of conventional commercial combined cycle commercial model;

FIG. 2-2 is an illustration of commercial pricing node options according to an exemplary embodiment;

FIG. 2-3 is a chart illustrating different sensitivities for Real-Time binding constraints between buses for the same combined cycle resource;

FIG. 2-4 is an illustration of configuration-based commercial pricing node weighing;

FIG. 2-5 provides example energy offer curves for 1×1 and 1×1-DB configurations;

FIG. 2-6 provides incomplete energy offer curve for 1×1-DB and the resulting Econ Min Energy Cost;

FIG. 2-7 provides an energy offer curve for 1×1-DB with $0/Megawatt hour ("MWh") offered up to Econ Min and the resulting Econ Min energy cost;

FIG. 2-8 provides an energy offer curve for 1×1-DB with up to Econ Min offer similar to 1×1 configuration and the resulting Econ Min energy cost;

FIG. 3-1 is an example commitment plan for resources according to the current disclosure versus a conventional commitment plan;

FIG. 3-2 is an example commitment instructions plan for resources according to the current disclosure versus a conventional commitment plan;

FIG. 4-1 is an example application of start-up and start-up notification time for a 2×1 configuration starting from All-Off;

FIG. 4-2 is an example of transitioning from 2×1 configuration to 2×1-DB configuration;

FIG. 4-3 is a diagram illustrating a current commitment process that embodiments of the current disclosure are developed to fit;

FIG. 4-4 is a chart illustrating conventional DA DB commitments may not be supported in RT;

FIG. 4-5 illustrates a first example of eligibility criterion to allow "Late Start";

FIG. 4-6 illustrates a second example of eligibility criterion to allow "Early Stop":

FIG. 4-7 illustrates an example of Look Ahead Commitment ("LAC") configuration commitment eligibility;

FIG. 4-8 illustrates fundamental structures of ECC configuration transitions;

FIG. 4-9 is a diagram illustrating current DA, RT and Automatic Generation Control ("AGC") processes that embodiments of the current disclosure are developed to fit;

FIG. 4-10 illustrates an example of dispatch logic according to an exemplary embodiment during a downward transition with disparity band;

FIG. 4-11 illustrates operational challenges of DB operation;

FIG. 5-1 is a chart illustrating example time periods for Make Whole Payments ("MWP") according to an exemplary embodiment;

FIG. 5-2 is the chart of FIG. 5-1, further illustrating an example of DA Revenue Sufficiency Guarantee Payments ("RSG") and Real Time Offer Revenue Sufficiency Guarantee Payments/Day-Ahead Market Assurance Payments ("RTORSGP")/("DAMAP")–1;

FIG. 5-3 is the chart of FIG. 5-1, further illustrating an example of "Roll DAMAP into RT RSG";

FIG. 5-4 is a chart illustrating RT MWP: Energy Contribution in an exemplary embodiment;

FIG. 5-5 is a chart illustrating RT MWP: Regulation Contribution;

FIG. 5-6 is a chart illustrating RT MWP: Energy Contribution from Lower RT Configuration;

FIG. 5-7 is a chart illustrating an example rolling DAMAP into RT RSG;

FIG. 5-8 is a chart illustrating the 5-minute RT dispatch and clearing prices in Hour Ending ("HE")-7;

FIG. 5-9 is a chart illustrating time interval 6:05— overlapping DA/RT commitment;

FIG. 5-10 is a chart illustrating time interval 6:50— reserve buyback during transition;

FIG. 5-11 is a chart illustrating RT MWP for intervals 6:00-6:55;

FIG. 5-12 is a chart illustrating RT MWP: DAMAP contribution when no overlapping RT commitment;

FIG. 5-13 is a chart illustrating a commitment example;

FIG. 5-14 is a chart illustrating example roll DAMAP into RT RSG approach to evaluate energy and reserve costs for transition down periods;

FIG. 5-15 is a chart more specifically illustrating time periods 7:50 and 8:10 of FIG. 5-14;

FIG. 5-16 is a chart illustrating an example RT MWP: Reduced energy output in higher RT configuration;

FIG. 5-17 is a chart illustrating an example RT MWP at time interval 5:05: Reduced energy output in higher RT configuration;

FIG. 5-18 is a chart illustrating an example DA RSG Start-up and Transition Cost for an exemplary embodiment with DA self-commit;

FIG. 5-19 illustrates DA RSG start-up and transition costs for conventional units with DA self-commit;

FIG. 5-20 is a chart illustrating exemplary RT RSG start-up and transition cost for an exemplary embodiment with RT self-commit;

FIG. 5-21 is a chart illustrating RT RSG start-up and transition costs for conventional units with RT self-commit;

FIG. 5-22 illustrates conventional DAMAP formulation;

FIG. 5-23 illustrate an exemplary expansion of multiple configuration offers and decision points according to an exemplary embodiment;

FIG. 5-24 illustrates exemplary DAMAP formulation according to an exemplary embodiment;

FIG. 6-1 is a chart illustrating typical combined cycle resource start-up and minimum run times; and FIG. 7 is a block diagram representation of an electrical power grid system according to an exemplary embodiment.

DETAILED DESCRIPTION

1. Introduction

Figures 1, 2:
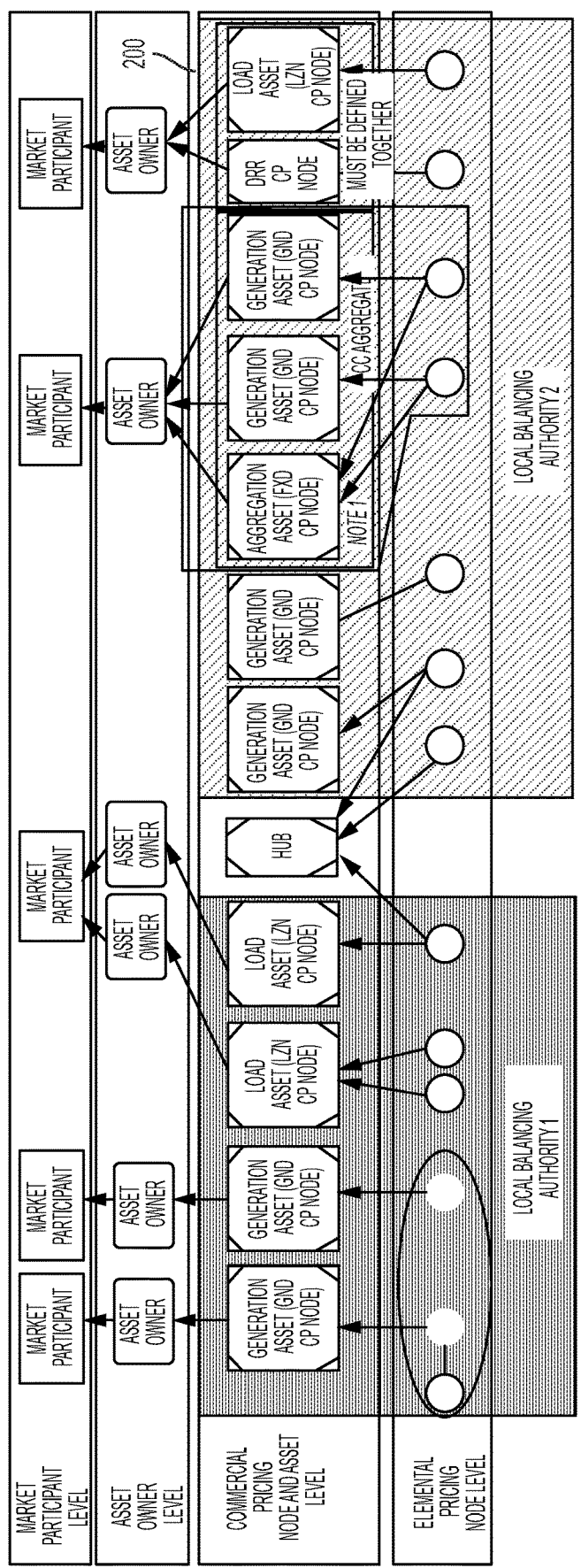
Figure 2:
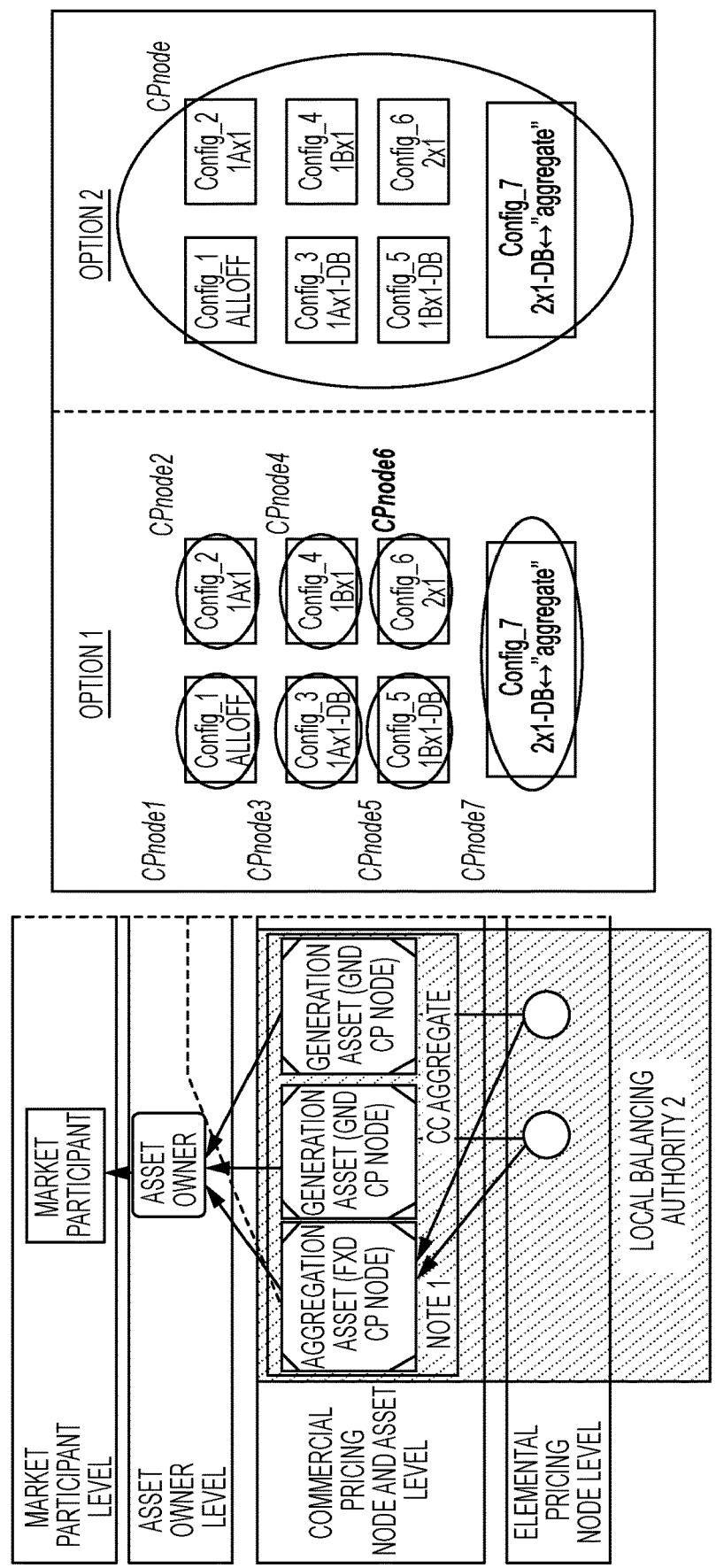
Figures 2, 3:
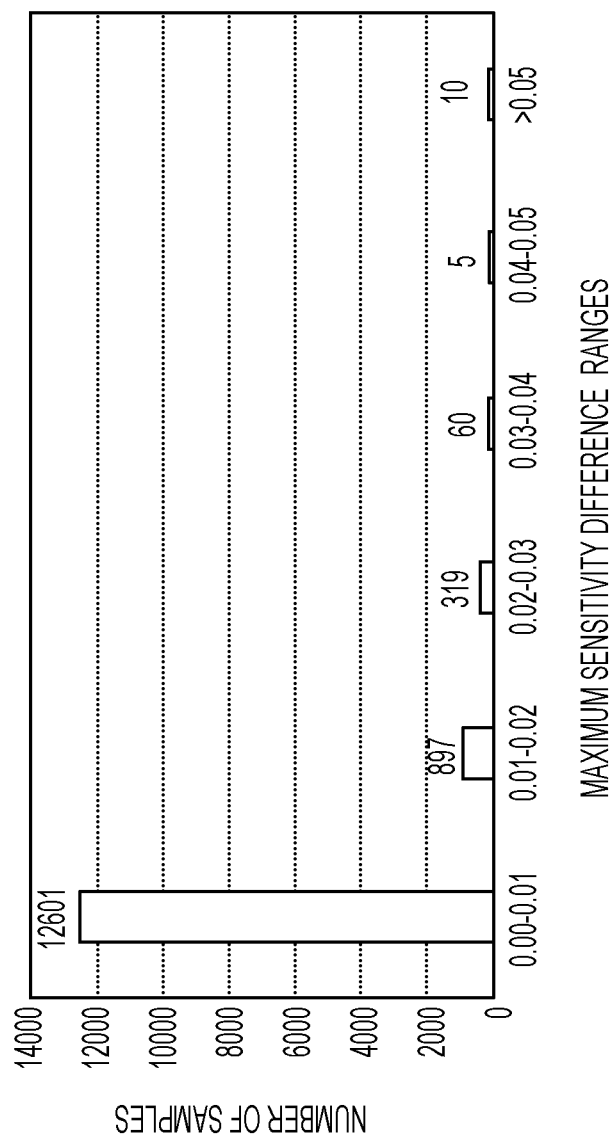
Figures 2, 3, 4:
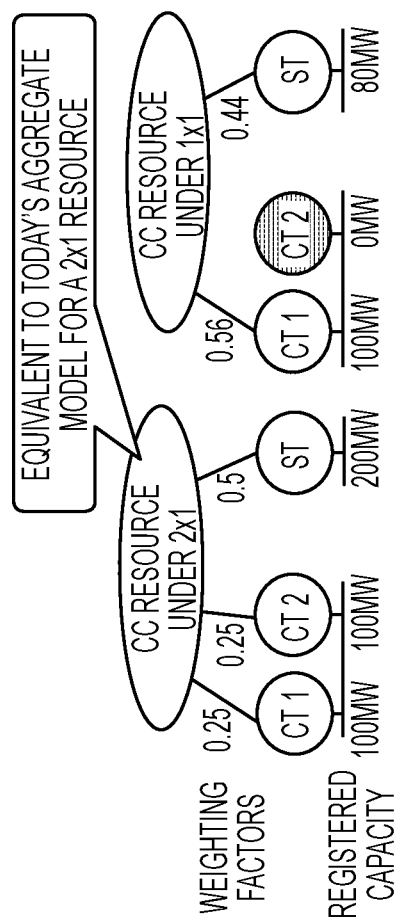
Figures 2, 3, 4, 5:
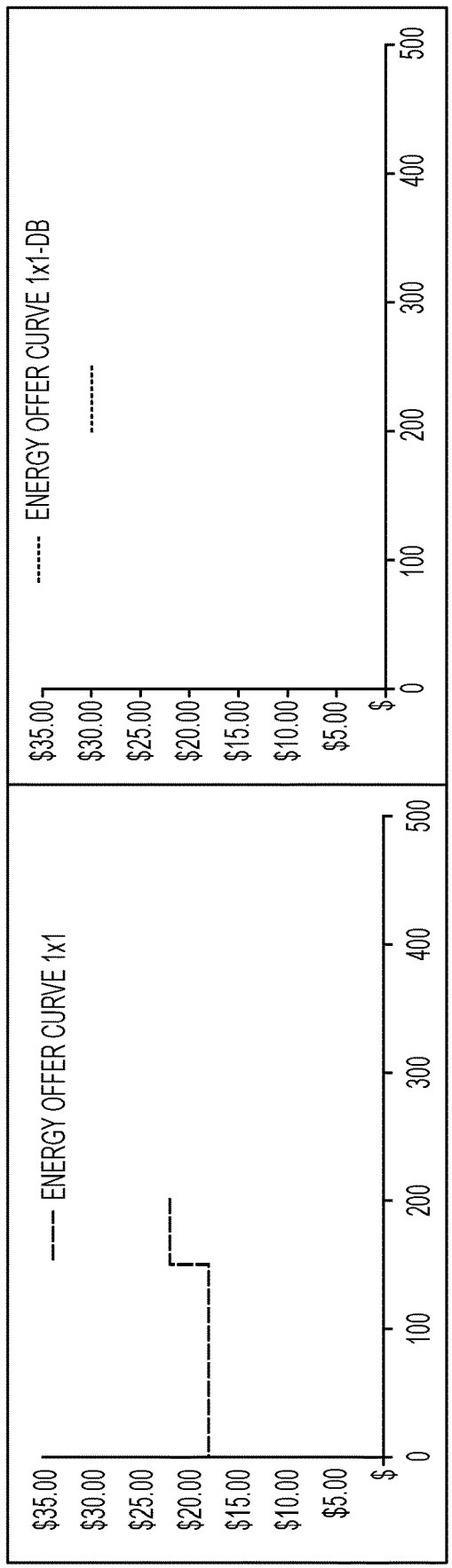
Figures 2, 3, 4, 5, 6:
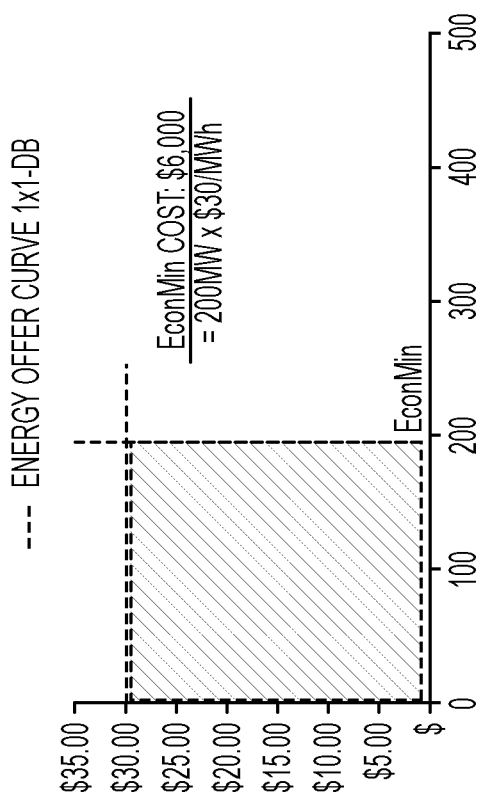
Figures 2, 3, 4, 5, 6, 7:
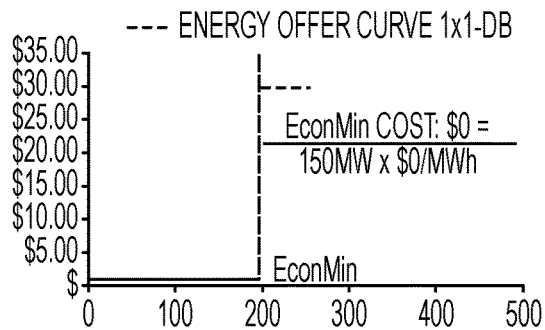
Figures 2, 3, 4, 5, 6, 7, 8:
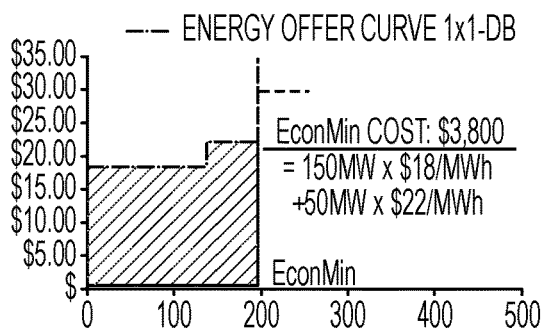
Figures 1, 3:
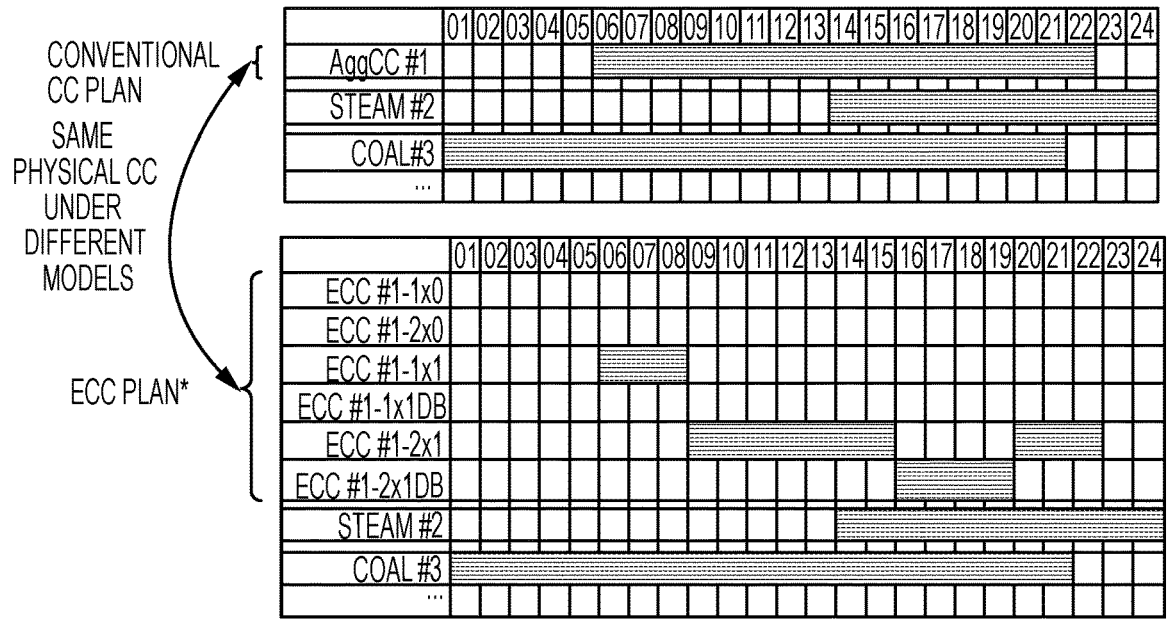
Figures 2, 4:
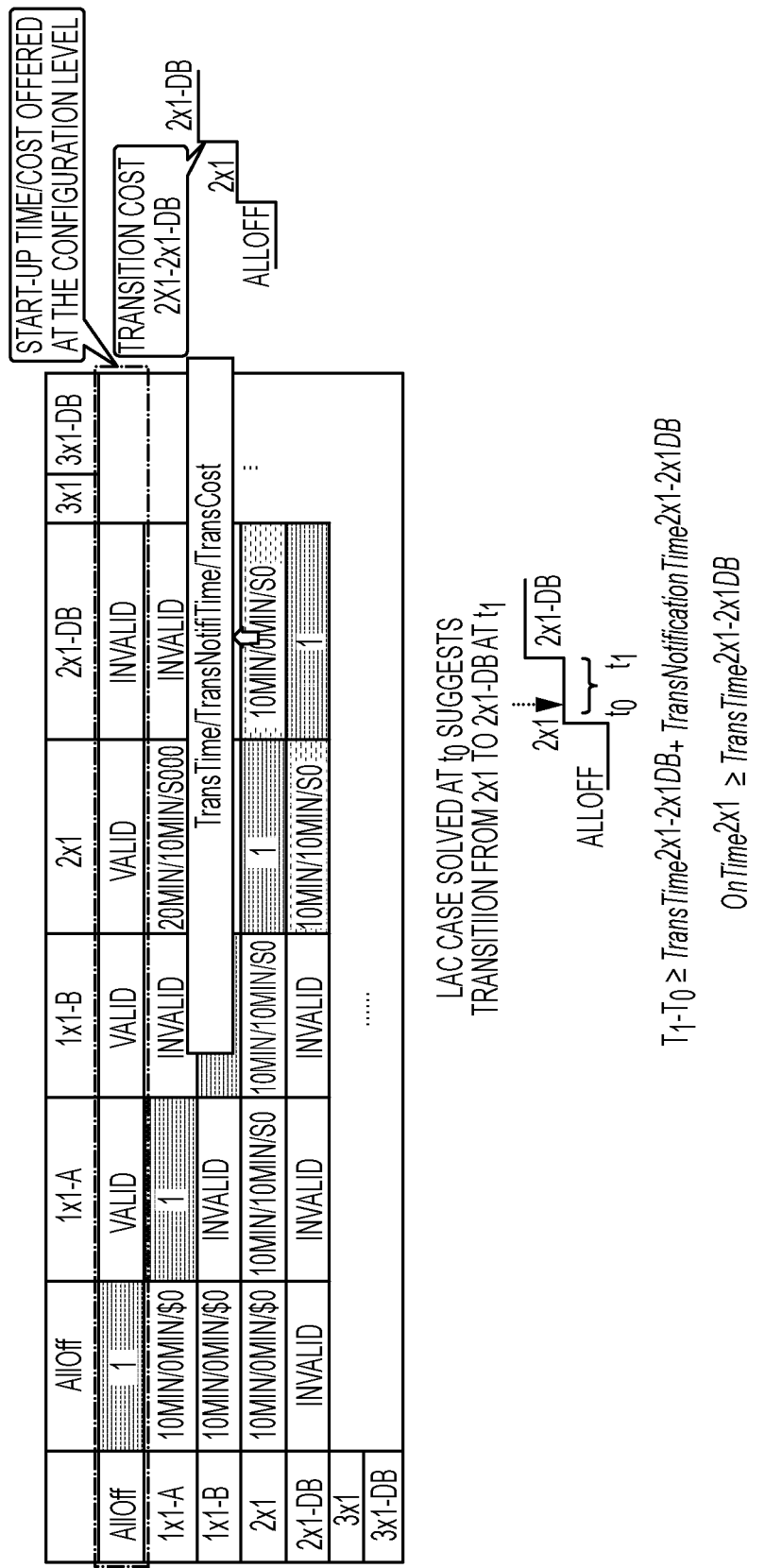
Figures 3, 4:
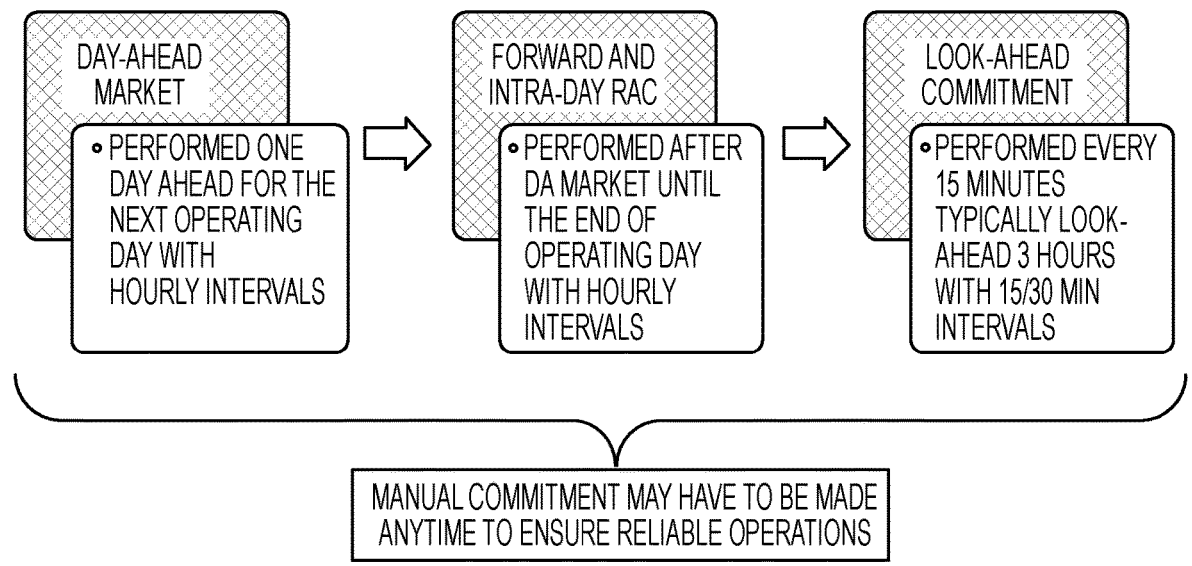
Figure 4:
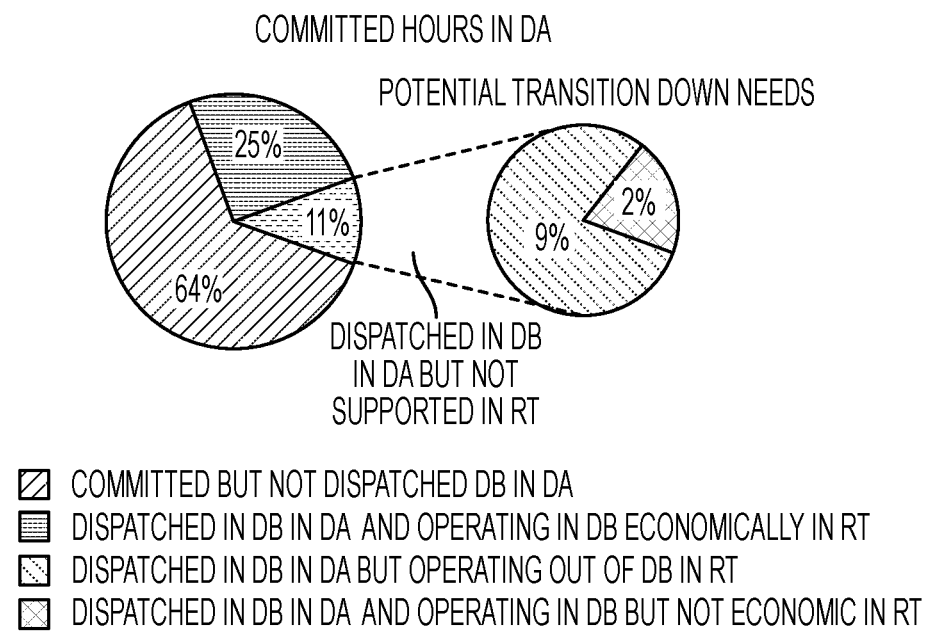
Figures 4, 5:
Figures 4, 5, 6, 7:
Figures 4, 5, 6, 7, 8:
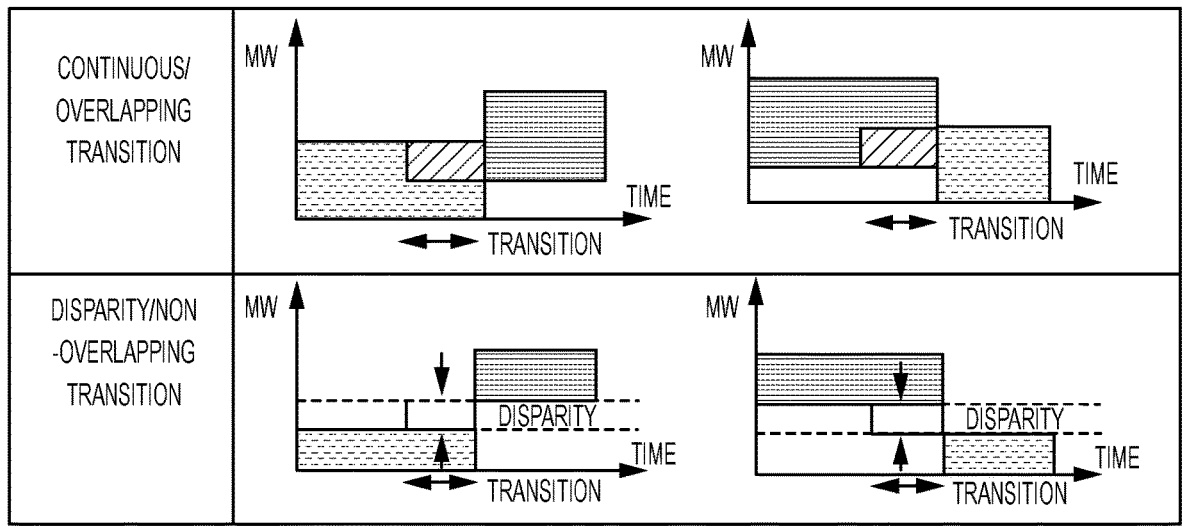
Figures 4, 5, 6, 7, 8, 9:
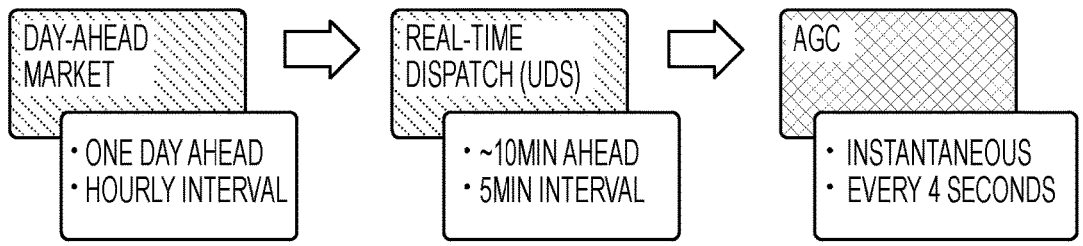
Figures 4, 5, 6, 7, 8, 9, 10:
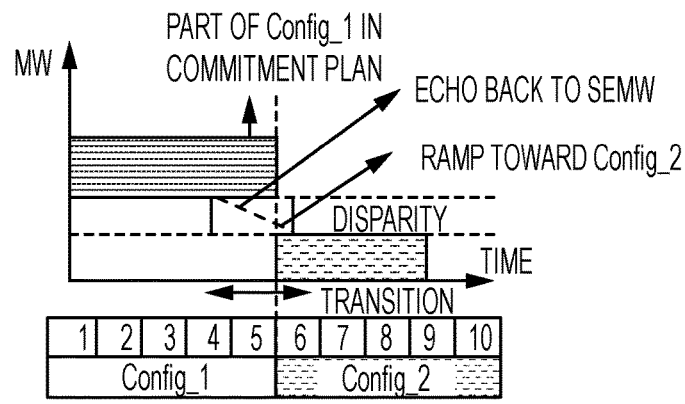
Figures 2, 5:
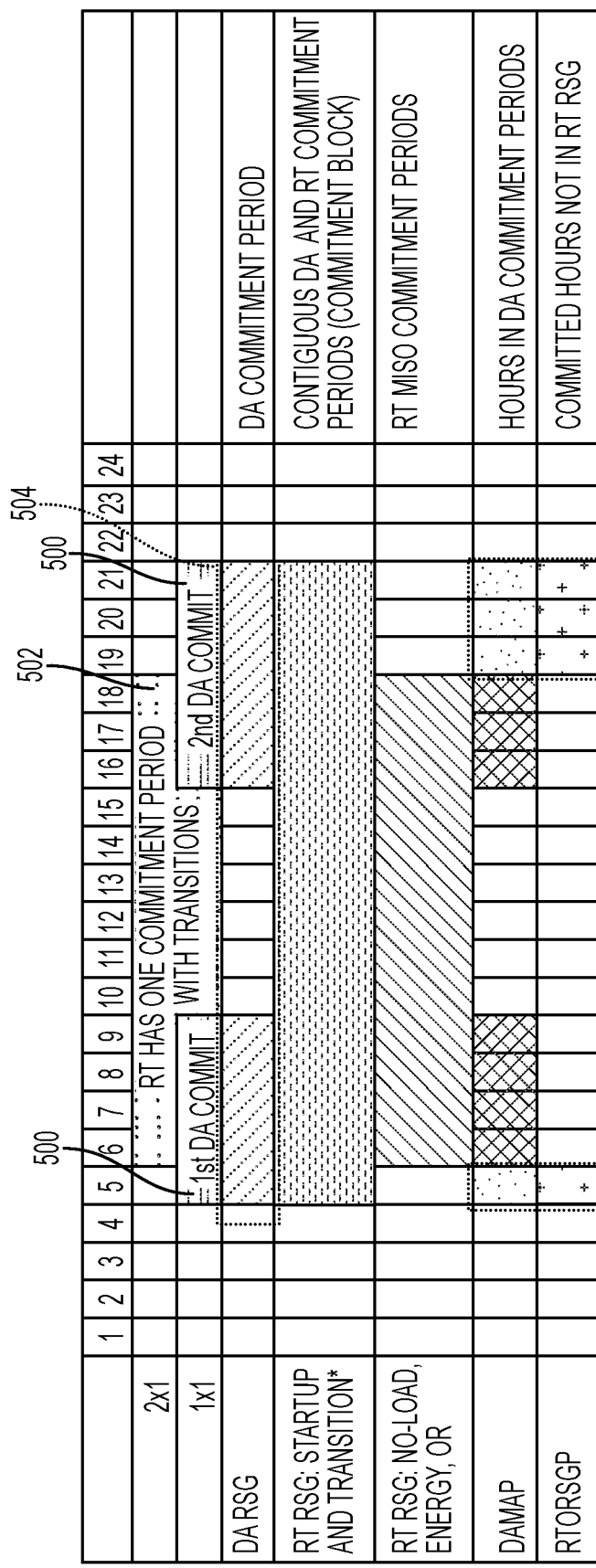
Figures 3, 5:
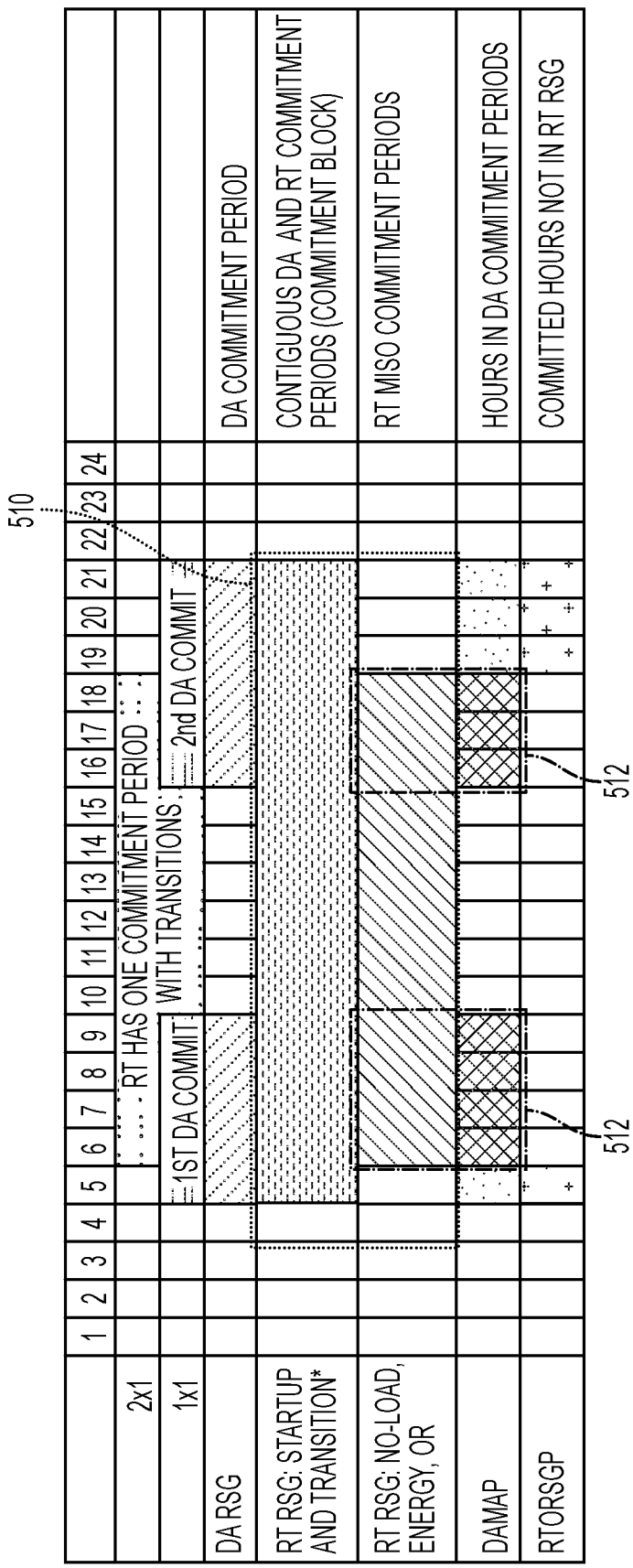
Figures 4, 5:
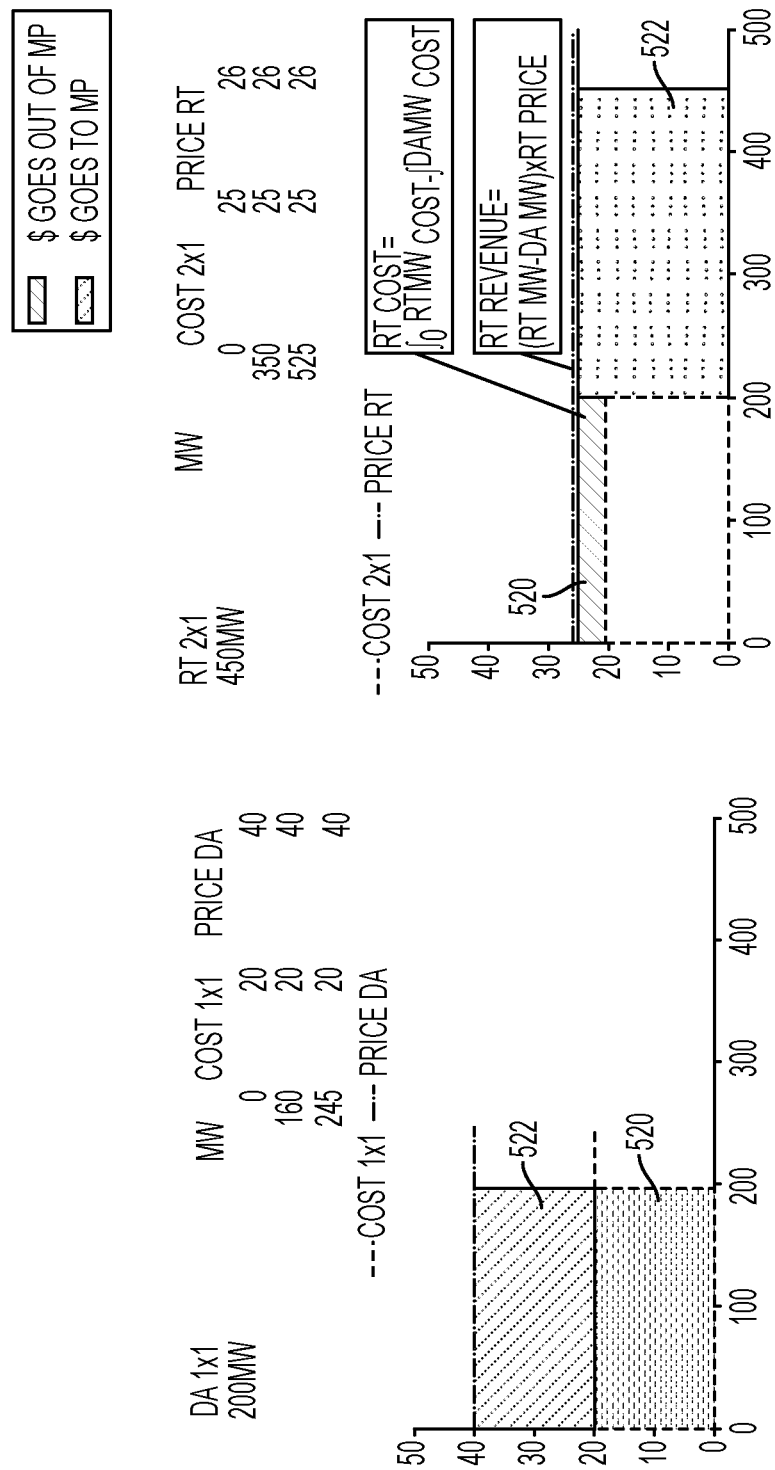
Figure 5:
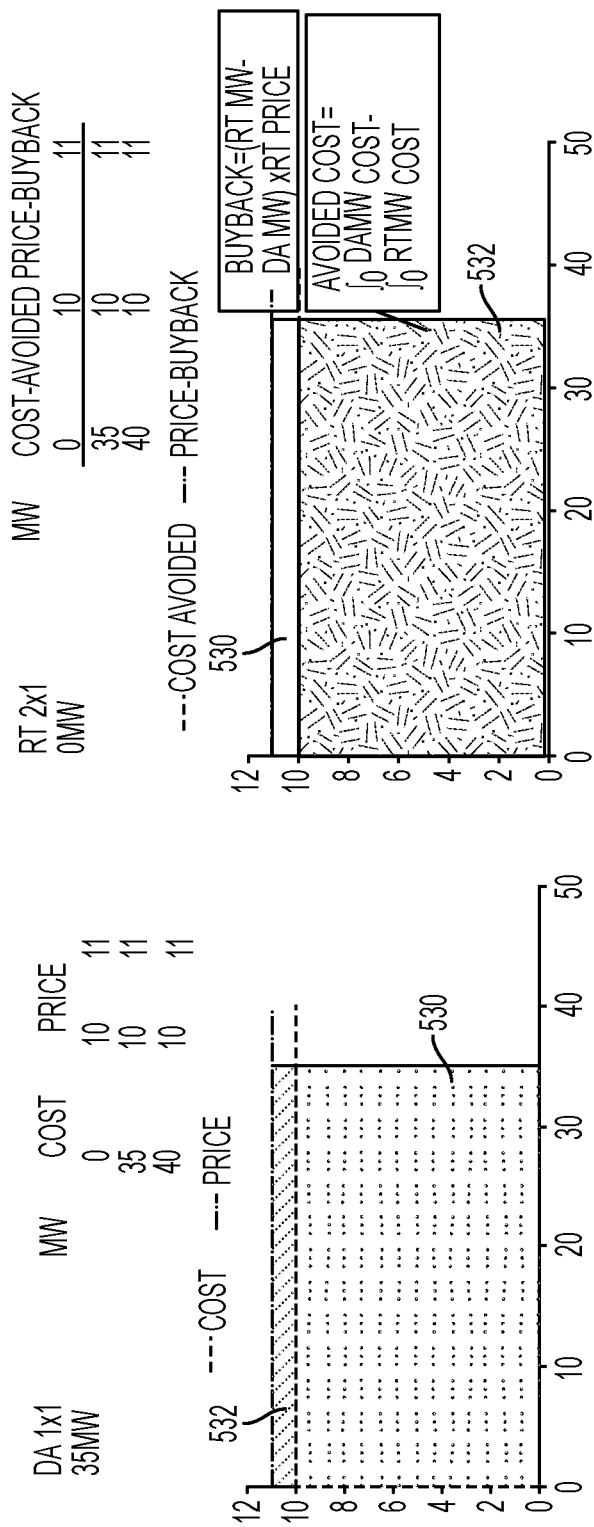
Figures 5, 6:
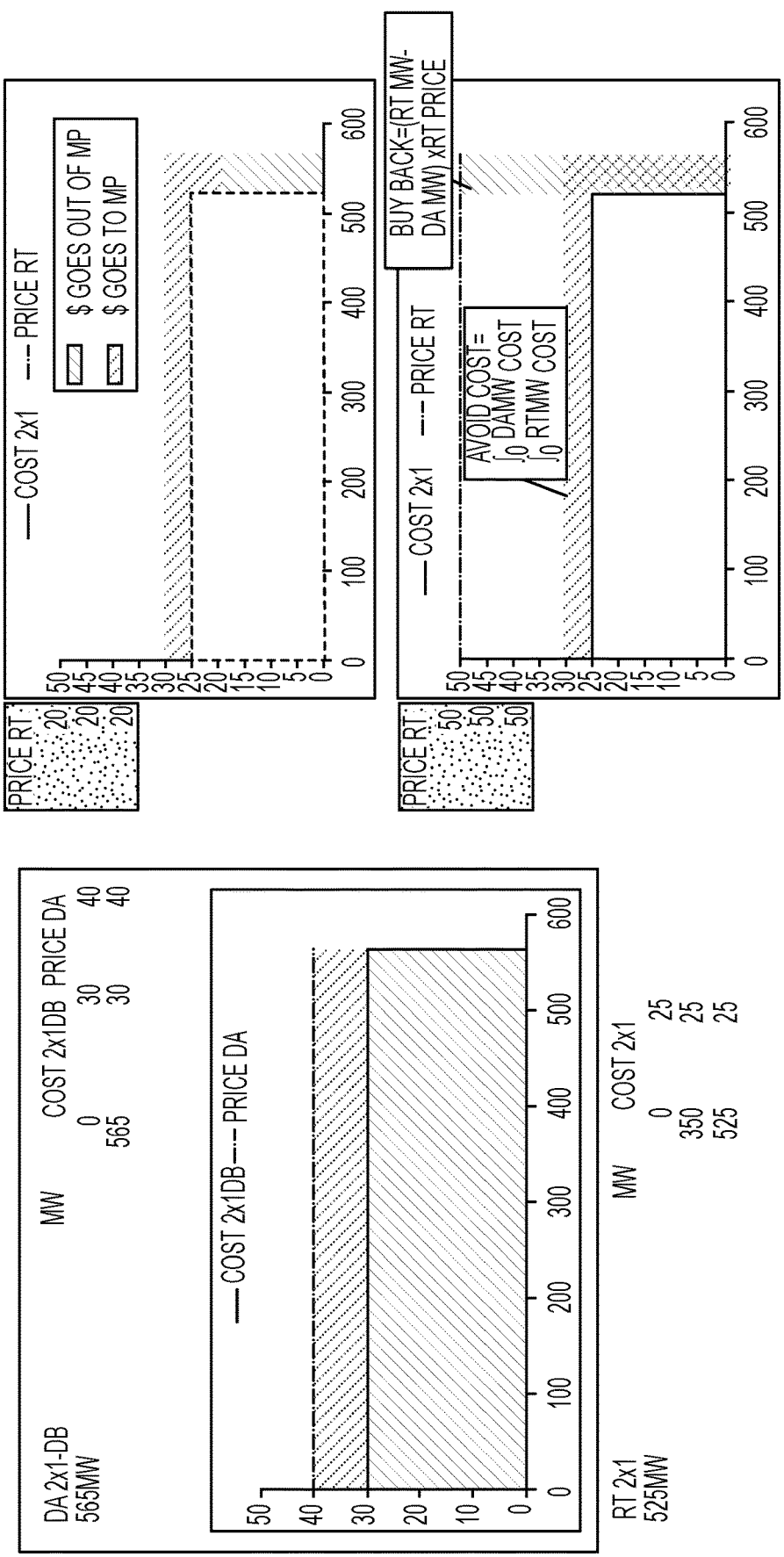
Figures 5, 6, 7:
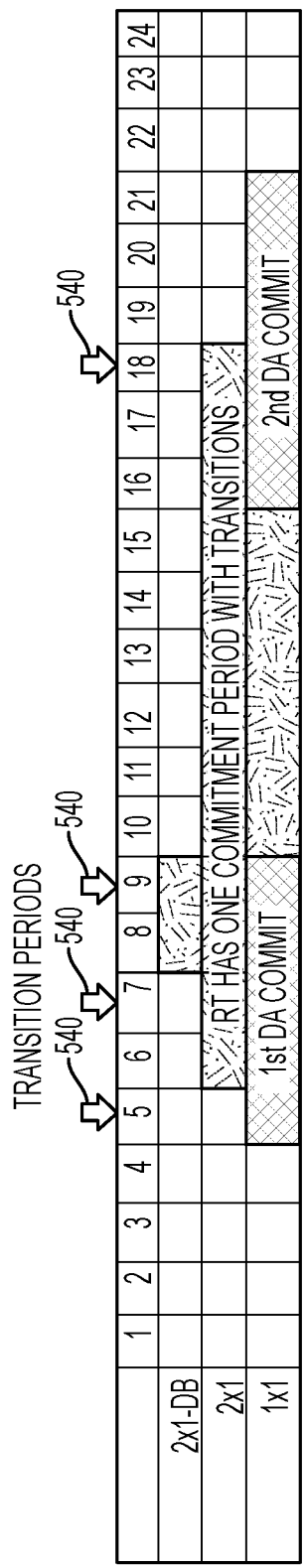
Figures 5, 6, 7, 8:
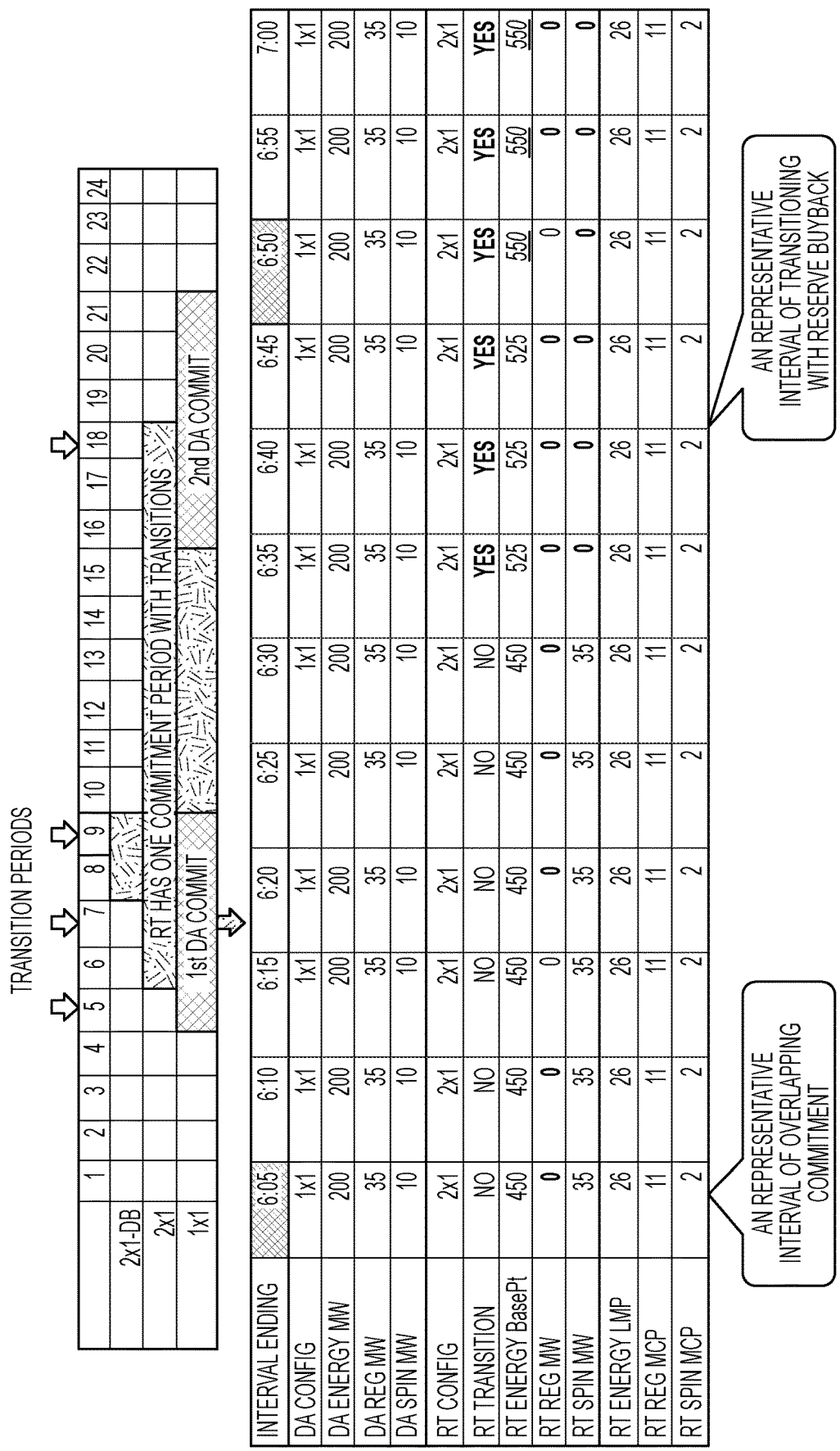
Figures 5, 6, 7, 8, 9, 10, 11, 12, 13, 14, 15, 16, 17, 18, 19, 20, 21, 22, 23, 24:
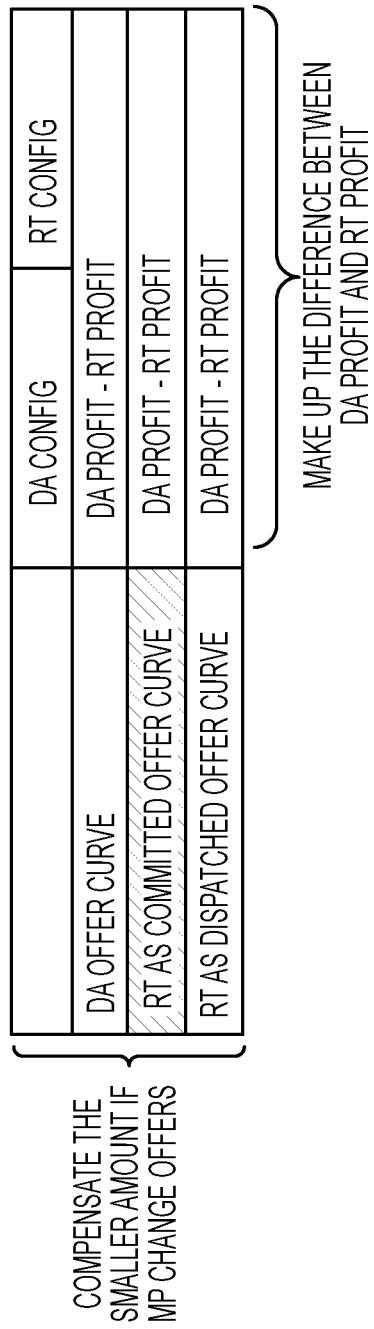
Figure 7:
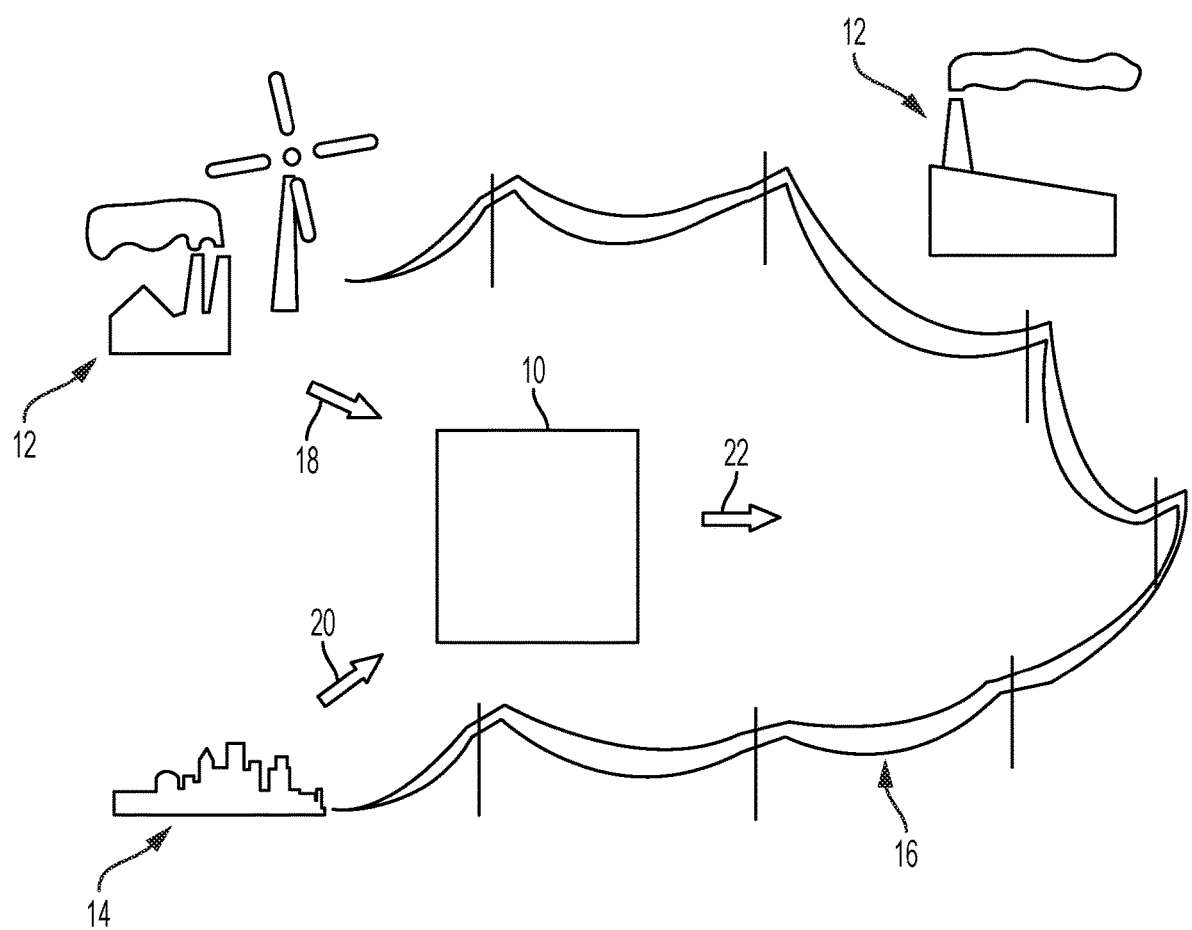

Referring to FIG. 7, an exemplary controller 10, according to the current disclosure, administers the market for electricity producers 12 and users 14 on an electric power grid 16. Some exemplary functions of the controller 10 include monitoring energy transfers on the transmission system, scheduling transmission service, managing power congestion, operating DA and RT energy and operating reserves ("OR") markets, and regional transmission planning. Certain of the electricity producers 12 may be able to offer combined cycle configurations, which may utilize a combination of physical power producing units such as one or more combustion turbines ("CT"), steam turbines ("ST"), DBs, pump storage, batteries, and the like. Both the electricity producers 12 and the users 14 may be considered to be MPs as they conduct business within the controller's 10 region. Traditionally, the electricity producers will provide offers 18 of electrical power for the grid 16 and the users will provide bids 20 for power from the grid 16. The controller 10 will process the offers 18 and bids 20 to determine commitments of electrical power and then controlling the dispatch 22 of electricity on the grid 16 based upon the commitments.

Figure 1:
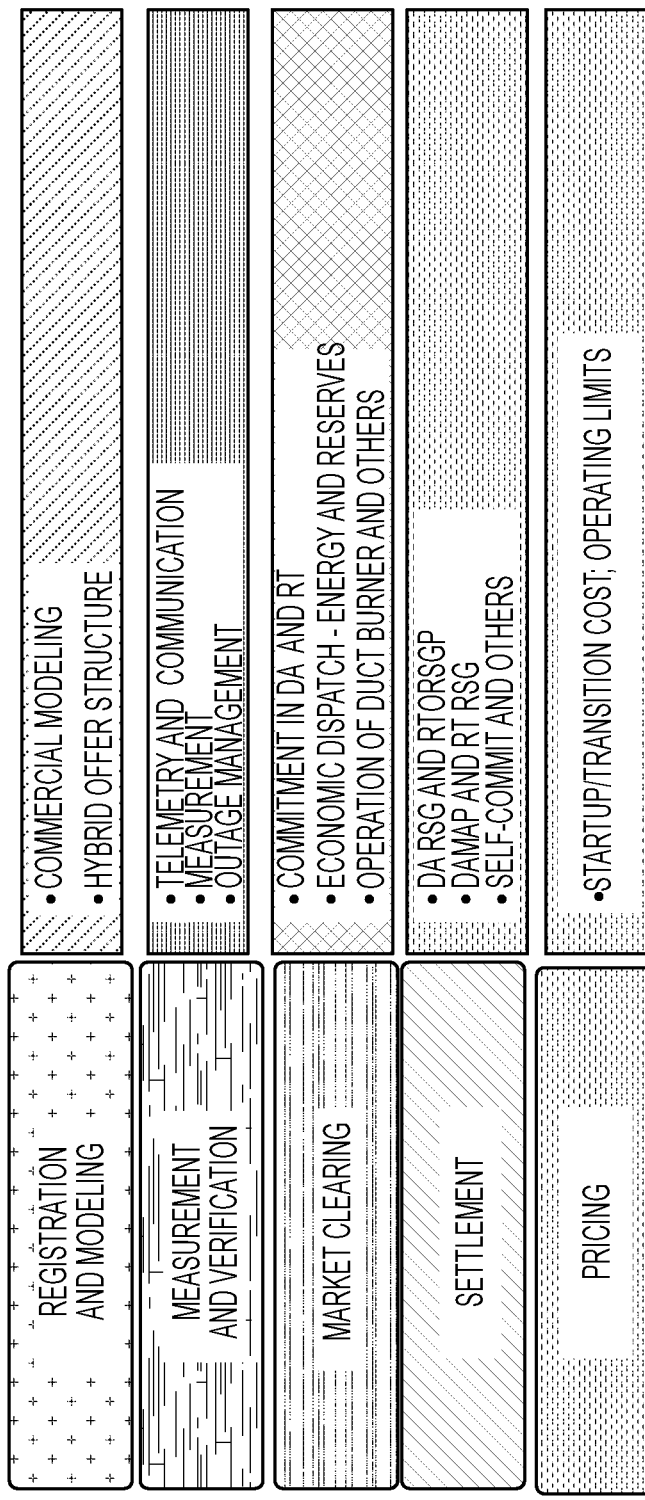
FIG. 1 is a block diagram illustration of design features desired for implementation of the exemplary ECC model according to the current disclosure.

As illustrated in FIG. 1, this disclosure divides the design features desired for implementation of the exemplary ECC model according to the current disclosure into sections representing different aspects of the power grid controller markets: Registration and Modeling; Measurement and Verification; Market Clearing; Market Settlement; and Pricing.

2. Registration and Modeling

Current embodiments provide a hybrid ECC model where operational parameters such as energy offer curves and ramp rates are offered on the configuration level, whereas other constraints such as minimum-run and minimum-down times are modeled at component level to best capture the physical operating characteristics of combined cycle resources.

2.1 Commercial Modeling

Historically, combined cycle resources have been modeled as an aggregate combined cycle resource and/or separate generation resources. FIG. 2-1 highlights the commercial model for the aggregate combined cycle model and the separate generation resource models in box 200. The depicted combined cycle resource is made up of two individual generation assets, e.g., one gas turbine and one ST, and one aggregate asset.

ECC modeling of the exemplary embodiment affords MPs the ability to offer several combined-cycle configurations including the ALLOFF configuration representing the entire combined cycle resource being offline for wholesale electricity production. MPs can register configurations to reflect their desired operating modes, including registering a CT-only or ST-only configuration. Each registered configuration indicates the underlying physical components anticipated to be operated, which allows the exemplary controller 10 to combine the appropriate configuration and component offer parameters when committing the ECC resource. Component substitution allows an MP to meet its commitment or transition instructions with different but equivalent components, as discussed below.

Component Substitution

The exemplary control model allows component substitution, primarily CT substitution, for configurations, which could be achieved using different combinations of the resource's components. Component substitution allows the MP to choose which component to operate as along the resource provide the offered capabilities. For example, to meet a 1×1 configuration commitment, an MP may choose which one of the combined cycle resource's two or more equivalent CTs to bring online. MPs will register one set of physical components associated with a configuration. Although the MP may substitute for the registered components, the exemplary controller 10 will track component on and off times associated with the registered components of the scheduled configurations in order to enforce the minimum up time, minimum down time, and maximum run time constraints for the physical components, in addition to the initial on time of configurations that is used to apply the appropriate start-up cost for starts from ALLOFF. The MP should ensure feasibility of any substitutions that vary from the controller's assumption of registered component use according to the communicated commitment schedule and bears any risks if the substitution results in infeasibility of component operating parameters.

An early embodiment provided a binary parameter to associate a component's operation with a specific configuration during registration. But the exemplary embodiment utilizes the specification of a component's usable capacity when operating in that configuration. Components such as DBs which do not directly output electric power to the grid may have specify a non-numeric code using an "On" value as shown in Table 2-1. For the example in Table, the ST can produce 100 Megawatts ("MW") of the 1×1A configuration 200 MW economic maximum operating limit. However, when DBs are used in the 1×1A-DB configuration, the ST can produce 120 MW. The usable ST capacity increases further for configurations using two CTs. The component-level usable capacity information will enable more accurate configuration-specific assumptions about the resource impact transmission constraints in forward studies.

TABLE 2-1

Registered Configuration table for ECC model

| Valid Configurations | Physical Units Usable Capacity | | | |
|---|---|---|---|---|
| | CT1 | CT2 | DB | ST |
| AllOff | | | | |
| 1Bx0 | | 100 | | |
| 0x1 | | | | 50 |
| 1Ax1 | 100 | | | 80 |
| 1Ax1-DB | 100 | | On | 120 |
| 2x1 | 100 | 100 | | 200 |
| 2x1-DB | 100 | 100 | On | 250 |

Other design elements are also modified as needed in support of component substitution.

Inter-Control Center Communications Protocol ("ICCP") current configuration: the exemplary controller will determine whether the resource is operating in the scheduled configuration by comparing the current configuration communicated by the MP via ICCP with the code registered for that configuration by the MP. If the configuration codes match, the exemplary controller deems the resource to be following the planned configuration schedule. Since defining multiple configurations even if they are equivalent, e.g., 1A×1 and 1B×1, can provide additional scheduling flexibility, the exemplary controller will allow the MP to register the same ICCP code for equivalent configurations. For the example in Table 2-2, it may be difficult to communicate clearly about being in configuration 1A×1 or 1B×1 when CT3 has been substituted in a 1×1 configuration. In this example, the MP has registered to send the ICCP code 110 for both registered 1×1 configurations. Neither the MP nor the controller will be forced to map between equivalent 1×1 configurations. The MP may choose to register different ICCP codes for equivalent configurations; the use of the same ICCP code for registered equivalent configurations is not required.

TABLE 2-2

Sample ICCP Configuration Code Registration for ECC model

| Valid Configurations | Physical Units | | | | | |
|---|---|---|---|---|---|---|
| | CT1 | CT2 | CT3 | DB | ST | ICCP |
| AllOff | | | | | | 000 |
| 1AX1 | 100 | | | | 100 | 110 |
| 1BX1 | | 100 | | | 100 | 110 |
| 2X1 | 100 | 100 | | | 200 | 210 |
| 2X1-DB | 100 | 100 | | On | 250 | 211 |
| 3X1 | 100 | 100 | 100 | | 300 | 310 |
| 3X1-DB | 100 | 100 | 100 | On | 340 | 311 |

Outage management: If all components of the combined cycle resource are outaged in Control Room Operations Window ("CROW"), then Market Systems will consider all the registered configurations as outaged, over-riding any resource offers. If only a subset of components are outaged in CROW, then Market Systems will ignore CROW outage information and use configuration commitment statuses in resource offers. The desire for all components to be on outage for the combined cycle to be outaged is similar to the current logic for the current aggregate combined cycle model. With this outage management approach MPs have the flexibility to maintain a configuration's availability by substituting available components for outaged registered components.

Resource Measurement: Measurement for performance, settlement, and other market functions will be at the resource level. For these functions, it will not matter which component produced the required output. The components modeled in the reliability model will continue to send individual RT telemetry to the exemplary controller. Where possible, controller will sum the component-level telemetry to produce a total for the combined cycle resource.

Commercial Pricing Nodes

The conventional approach of assigning each registered resource to a single commercial pricing node ("CPnode") with a single model for the resource's impact on transmission congestion and pricing will be expanded for ECC resources. Having multiple components with potentially multiple transmission system buses, ECC resources may have a different transmission impact depending on their configuration. For improved accuracy, each configuration for the same ECC resource may have a different transmission impact model which is represented as a set of configuration-specific weighting factors describing the relative injections at the resource's buses for that configuration.

Two commercial model implementation options have been discussed to associate configurations and CPnodes: (1) Multiple CPnodes, each associated with an individual configuration or (2) a single Aggregate ECC CPnode, representing all of the ECC resource's configurations. Further selection between the two options will be determined during the solution design phase based on the implementation feasibility of impacted business areas. FIG. 2-2 illustrates these two options.

Design considerations include but are not limited to the complexity of modifying resource offers and associated infrastructure to include configurations as a unique identifier, the maintenance of offer parameters across multiple CPnodes, the complexity of settlements, and consistency with existing offer options.

The following characteristics related to CPnodes will be supported for ECC resources for either of the CPnode modeling options above:

Single Price for all CPnodes Associated with an ECC Resource

Either CPnode implementation option produces only one price for the ECC resource for any given pricing interval. Since there may be one and only configuration committed for any given pricing interval, the ECC resource price will represent the effective configuration and/or operational state of the ECC resource. If an ECC resource has multiple CPnodes, they will all have the same price of the operating configuration/CPnode for any individual pricing interval.

Active CPnode Weighting Factors Based on Selected Configuration and/or More Accurate System Knowledge An ECC resource has multiple underlying components at different injection points that may or may not be connected to different transmission system buses. Although most combined cycles have components connected at the same bus or have similar transmission constraint impacts for all components, FIG. 2-3 shows that a few exceptions have components connected at buses with different constraint impacts which lead to differences in configuration sensitivities to binding constraints.

When determining the cleared output and Locational Marginal Pricing ("LMP") for a resource, the exemplary controller 10 evaluates its transmission impacts by aggregating over the buses connected to each of the injection points using a prescribed method to determine a set of normalized weighting factors. With the current aggregate combined cycle model, weighting factors are determined by the following methods: Forward studies and RT pricing/settlement.

Forward studies: static factors at resource level based on component registered capacity at each connection point RT pricing/settlement: component MW outputs at each connection point For ECC resources, RT pricing and settlement will continue to use the weighting factors set by RT MW output. For forward studies, by default the ECC resource component capacity-based weighting factors of the existing aggregate model can continue to be used. Where accuracy can be improved with the additional knowledge of which components will be used in conjunction with the selected configuration, the forward study weighting factors can be specified by configuration. As illustrated in FIG. 2-4, if CT2 is offline in the selected 1×1 configuration, the configuration-specific weighting factors will be more accurate.

For configuration-specific weighting factors to both improve accuracy and support component substitution, components which might be substituted should be at the same transmission bus. Substitutable components are typically CTs which are connected on the same transmission bus. Further, the current resource-level weighting can still be used when needed simply by setting the same factors for all configurations.

2.2 Hybrid Offer Structure

There will three levels of offer parameters modeled for a registered ECC resource: Resource Level, Configuration Level, and Component Level.

Resource Level Offer Parameters

The registered ECC resource level offers are a new set of parameters introduced by the ECC model to describe the transition between operating configurations. As shown in Table 2-3 for transitions from the configuration specified in the row to the configuration specified in the column, the transition offers specify Transition Validity, Transition Time, Transition Notification Time, and Transition Costs (Transition Time nn min, Transition Notification Time nn min, Transition Cost dd $).

TABLE 2-3

Example of a Transition Matrix

|        | AllOff              | 1X1-A               | 1X1-B               | 2X1                   | 2X1-DB              | 3X1 | 3X1-DB |
|--------|---------------------|---------------------|---------------------|-----------------------|---------------------|-----|--------|
| AllOff | 4                   | valid               | valid               | valid                 | invalid             |     |        |
| 1X1-A  | 10 min/0 min/$0     | 4                   | invalid             | 30 min/10 min/$900    | invalid             |     | .      |
| 1X1-B  | 10 min/0 min/$0     | invalid             | 4                   | 30 min/10 min/$900    | invalid             |     | .      |
| 2X1    | 10 min/0 min/$0     | 10 min/10 min/$0    | 10 min/10 min/$0    | 4                     | 10 min/0 min/$50    |     | .      |
| 2X1-DB | invalid             | invalid             | invalid             | 10 min/10 min/$0      | 4                   |     |        |
| 3X1    |                     |                     |                     | . . .                 |                     |     |        |
| 3X1-DB |                     |                     |                     |                       |                     |     |        |

Transition Validity specifies whether a transition between two configurations is valid or not. All valid transitions are identified by the MP during the quarterly model registration process. MPs can override a transition to be invalid in their hourly offer to more accurately specify the latest operating capabilities. Other transition offer data is valid only for the registered transitions.

Transition Time is an hourly parameter to indicate the period of time during which the ECC resource is transitioning and cannot supply regulation and contingency reserves. The exemplary controller 10 will disqualify ECC resources from clearing regulation and contingency reserves for the specified duration. The Transition Time will be applied at the end of "from" configuration prior to completing the transition to the "to" configuration. As such, the time the resource is scheduled in the "from" configuration must be at least the transition time.

Transition Notification Time is also an hourly parameter. Similar to Start Notification Time, this parameter specifies additional time following the controller's instruction to perform the first transition prior to the beginning of the transition time. The Transition Notification Time allows the MP to specify time needed for procuring fuel, performing coordination, or preparation activities.

Transition Cost is a daily parameter that specifies the fixed cost incurred for the transition. A single transition cost is modeled for each transition without considering applicable state of hot, intermediate, or cold, Section 3 contains further explanation.

The resource level offer parameters are summarized in Table 2-4.

TABLE 2-4

Offer Parameters on the Resource Level

| Parameter | Attributes | Time granularity |
| --- | --- | --- |
| Transition Validity | Specify whether a transition between two configurations is valid | Quarterly/ hourly |
| Transition Time | Used to disqualify reserve at the end of the "from" configuration | Hourly |
| Transition Notification Time | Time needed to notify prior to beginning the Transition Time | Hourly |
| Transition Cost | Fixed cost incurred for the transition. One cost is modeled for each transition (does not vary by state of hot, intermediate, or cold) | Daily |

Configuration Level Offer Parameters

The majority of the offer parameters conventionally available for a generating unit will be offered on the configuration level for ECC resource including the following: Hot-to-Cold/Intermediate time and start-up cost when starting from ALLOFF; start-up time and start-up notification times for the first start from ALLOFF; incremental energy offer curve; reserve offers; ramp rates; maximum and minimum output limits (economic, emergency, regulation); dispatch and commitment statuses; no-load cost; regulation/contingency reserve qualification; maximum daily energy; and maximum daily starts.

The start-up parameters apply to a configuration starting from ALLOFF similar to the way they apply to generating units in the prior art. To capture differences in state of hot, intermediate, and cold, three sets of start-up cost, start-up times, and start-up notification times, as well as hot-to-cold time and hot-to-intermediate times, are considered for each configuration when an ECC resource is starting from ALLOFF. Start-up costs, hot-to-cold time, and hot-to-intermediate times are daily parameters. Since different times might be needed for the first start of the resource from ALLOFF depending on, e.g., how fast personnel can be ready to turn on the ECC resource, both start-up notification time and start-up times are hourly parameters.

Most of the parameters at the configuration level such as energy offer curves, reserve offers, ramp rates, max/min output limits, dispatch status, commitment status, no-load cost, and maximum daily energy/starts are defined as plain and ordinary meaning in the field. Since only one of an ECC resource's configurations can be committed at a time, the MP can specify the Commitment Status of at most one of an ECC resource's configurations as must-run at a time to indicate the configuration they would like to run.

It should also be noted that with incremental energy offer modeled at the configuration level, the energy offer curve for each configuration should be a complete incremental energy offer curve from 0 MW to the configuration maximum. Each configuration's offer curve should be independently specified, even if part of a configuration's curve is similar to that of another configuration, For example, the 2×1 configuration and 2×1-DB configuration may have the same offer curve up to the maximum of the 2×1 configuration, but MPs still should specify the entire range for the 2×1-DB configuration. DB configurations may have only a narrow range of operation between their Econ Min (Economic Minimum Dispatch: The minimum MW level at which a Resource may be dispatched by the Transmission Provider in real-time for Energy under normal system conditions) and Econ Max, but MPs still should specify their offer curve below Econ Min to appropriately represent its minimum generation cost as the combination of no-load cost and the energy offer curve from 0 MW. Although costs below Econ Min will not affect dispatch once committed, it may affects 1) whether configuration is committed when competing with other configurations and other resources; 2) MWP production cost calculations, where under-represented cost below Econ Min can result in less MWP. Offer parameters from each configuration only apply to that configuration; other configurations do not inherit any data from another configuration.

Example 2.2-1 Energy Offer Curve

Table 2-5 shows energy offer curves for 1×1 (labeled 1CT+1ST_CC) and 1×1-DB (labeled 1CT+1ST+DUCT_CC indicating operation of the DB with the 1×1 configuration) configurations. The 1×1-DB configuration has an incomplete energy offer curve.

TABLE 2-5

Example of energy offer curves for 1 × 1 and 1 × 1-DB

| Configuration name | SEGMENT_ID | HOUR(dd-mm-yyyy hh) | BAND_MW (segment end) | BAND_PRICE ($/Mwh) |
| --- | --- | --- | --- | --- |
| 1CT + 1ST_CC | 1 | 08-MAR-2017 01 | 150 | $18 |
| 1CT + 1ST_CC | 2 | 08-MAR-2017 01 | 200 | $22 |
| 1CT + 1ST + DUCT_CC | 1 | 08-MAR-2017 01 | 200.1 | $30 |

TABLE 2-5-continued

Example of energy offer curves for 1 × 1 and 1 × 1-DB

| Configuration name | SEGMENT_ID | HOUR(dd-mm-yyyy hh) | BAND_MW (segment end) | BAND_PRICE ($/Mwh) |
|---|---|---|---|---|
| 1CT + 1ST + DUCT_CC | 2 | 08-MAR-2017 01 | 250 | $30 |

In this offer, the 1×1 configuration energy offer is consistent with the offer we see for a conventional resource. The 1×1-DB configuration only has offer of $30/MWh for the dispatch range of 200 MW-250 MW. The market interprets the first point as the cost from 0 MW to the first MW value, i.e., 200.1 MW for the 1×1-DB curve.

As a result, the 1×1-DB configuration energy offer at Econ Min offer is extrapolated back to zero and the 1×1-DB would configuration appear much less competitive for commitment.

Even if 1×1-DB would not be operated below its Econ Min, MPs should carefully specify the offer below Econ Min to accurately represent the true cost of operating the 1×1-DB configuration. Otherwise, if a MP under represents the true cost or even offers zero for the offer curve below Econ Min (see FIG. 2-7), then the MWP calculation would be based on the as-offered cost that under represented the true cost.

The offer of 1×1-DB below Econ Min may or may not be the same as the 1×1 cost curve but should be based on actual production cost. It is not necessary for the offer of 1×1-DB below Econ Min to be the offer curve of 1×1 if the underlying production cost is different. If the offer curve of 1×1-DB below Econ Min is the same as the offer for the 1×1 configuration, the energy offer cost at Econ Min for 1×1-DB would be $3,800 as shown in FIG. 2-8.

Component Level Offer Parameters

While most of the parameters at the configuration level are similar to conventional offer parameters of conventional resources, the following parameters available for conventional resources are modeled at the component level for exemplary ECC registered resources: Minimum run time, Minimum down time, and Maximum run time.

By modeling these offer parameters at the component level rather than at the configuration level, the associated physical component operating constraints can be more accurately reflected in the Security Constrained Unit Commitment ("SCUC"). If these component-based operating constraints are modeled more abstractly at the configuration level, operation of the ECC resource can either risk running into infeasibility if parameters are determined aggressively or lose scheduling flexibility if the parameters are determined conservatively.

3. Measurement and Verification

In this section, additional telemetry data are introduced based on the operating characteristics of ECC resources. With the enhanced model of the current disclosure, communication through Extensible Markup Language ("XML") or the Midcontinent Independent System Operator Communication System ("MCS") will also be updated since the transition among different configurations will be explicit controller commitment decisions as compared to the conventional approach of the MP deriving implicit plant operation schedules embedded in the dispatch decisions. The ECC resources will continue to be measured at the resource level, as is conventional, which is consistent with the flexibility of component substitution within the ECC resource.

3.1 Telemetry and Communication

Two new telemetry data points will be required for ECC resources to support input needed for RT market clearing: "Current Configuration" indicating the actual configuration the ECC resource is operating with using the ECC resource's registered configuration codes (see Section 2.1 and Section 4.3); and "Transition Status" indicating whether the ECC resource is transitioning and unable to clear regulation and contingency reserves (see Section 2.2 and Section 4.4)

These data will also be used for settlement, e.g., to verify the operated configurations and confirm if a transition indeed occurred. Operations will use the RT information of the resource's current configuration to provide increased situational awareness about the ECC resource operation. Although other options were discussed for "Transition Status", inputs from both MPs and Controller Operations have concluded that a simple binary variable is the best way to communicate when the resources is in transition and cannot be cleared for regulation or contingency reserves.

The new ECC resource telemetry will be input to the exemplary controller's RT market Unit Dispatch System ("UDS") where they will be combined with additional inputs to impact market clearing. During Enhanced Combined Cycle Task Team ("ECCTT") discussions, there was interest in sending the ECC resource configuration and transition status used with the current UDS dispatch to the MP via ICCP. This approach is similar to the conventional approach for control mode where each resource current CMODE is telemetered to the exemplary controller and the UDS CMODE is sent back to the MP. The ICCP communication of these additional UDS outputs is suggested to solution design.

The communication of the resource commitment plan will continue to be through MCS and XML with adjustment for ECC configurations and their transitions. In contrast to the conventional existing aggregate combined cycle model, in which the controller commitment indicates when the resource should be online but not when certain configurations should be used, the exemplary controller 10 of the current disclosure will explicitly schedule configurations and transitions between configurations for ECC resources. The communicated commitment plan will indicate when each configuration should be used and when the ECC resource should be started, stopped, or transition between configurations. FIG. 3-1 shows a mock-up MCS view of the controller's commitment plan including a combined cycle resource under the ECC model where each configuration is explicitly scheduled, as compared to the commitment schedule for the resource under the conventional combined cycle "Aggregate" model.

FIG. 3-2 further illustrates the exemplary controller's commitment plan instructions to be communicated through XML including a combined cycle resource under the ECC model as compared to those under the conventional Aggregate model.

Conventionally, with the aggregate model, transitions, e.g., between 2×1 and 2×1-DB, are not modeled in the controller's plan and are determined by the MP to produce the controller-instructed dispatch MW. Under the ECC model, configuration changes will be modeled explicitly in exemplary controller's plan.

3.2 Measurement

Measurement will be at the resource level for ECC resources. Similar to conventional treatment of aggregate combined cycle resources, Telemetry Volume of each combined cycle child resource will be measured and aggregated to the resource level to calculate Dispatch Interval Excessive/Deficient Energy. For Ancillary Services, the Cleared MW Volume for the ECC resource will be used. MWPs will be calculated as described in Section 5.1 on the ECC resource level and other payments will then be calculated in the same way as for other Resources. Measurement of the total resource output will allow the flexibility of CT substitution.

3.3 Outage Management

As mentioned earlier in Section 2.1, CROW outages for components of an ECC resource are treated similarly to the conventional practice for Aggregate combined cycle resources. If all components of the ECC resource have outages entered in CROW for the same time interval, then all of the registered configurations (except the ALLOFF configuration) will be treated as outaged. If only a subset of components have outages entered in CROW, then the CROW outage information will be ignored and the configuration commitment statuses will be used to determine which configurations are available for market clearing. This outage management approach leverages conventional practice to avoid rigid component-to-configuration registration and supports flexible component substitution.

The new ECC model of the current disclosure is able to deal with ST outages when the ECC cannot operate in combined cycle mode. The conventional aggregate combined cycle model allows daily switching from aggregate Combined Cycle to multiple individual resources representing the components when such outages occur. According to exemplary embodiments, two options are supported which can be used to address ST (or potentially other equipment) outages when using the ECC model:

Option 1: Change configuration offer parameters to reflect lost components, e.g., 1×1 parameters represent 1×0 operation Option 2: Register a place-holder configuration representing operations without the unavailable component, e.g., 1×0, if configurations are available within the maximum limit for the number of configurations If a CT is out for a 2×1 ECC resource and the resource can still operate in combined cycle mode, the MP can simply set its 2×1 configuration commitment status to outage and offer its 1×1 configuration as economic. Resources that cannot run without ST are exempt from this issue; when the ST is out of service, the MP is responsible for offering all configuration commitment statuses as outaged to ensure a configuration with an un-outaged component is not available for commitment.

4. Market Clearing

ECC modelling according to exemplary embodiments of the current disclosure expands the traditional on/off commitment decisions for resources, to optimize the commitment and transitions among multiple resource configurations. Conventionally, a conventional resource can only be committed either in the DA market or in the RT market, whereas with exemplary embodiments, an ECC resource having multiple configurations can be committed in the DA market and then committed/transitioned to run in different configurations in the RT market. The exemplary controller's optimized commitment of configurations largely addresses the operation challenges that combined cycle resources face conventionally. For example, deciding when to operate DBs is a conventional challenge for combined cycle owners. The ECC model of the current disclosure enables the exemplary controller 10 to optimize the use of DBs providing additional benefits to the system and assistance to combined cycle operators facing more variable system conditions. In addition, since the exemplary controller 10 is scheduling transitions from one configuration to another and the time of transition is known, more accurate modeling of the combined cycle resource operating characteristics can lead to improved energy and reserve dispatch which can be better followed by combined cycle operators.

4.1 Commitment within DA and RT

Conventionally, under the aggregate combined cycle model, the conventional controller makes on/off commitment decision of the whole combined cycle resource without visibility of the underlying components and determines dispatch MW based on as-offered min/max output limits, ramp rates, and other offer parameters. (Since these parameters vary by configuration, the applied parameters under the aggregate combined cycle model may be inaccurate for the needed configuration). MPs merge the conventional controller dispatch instructions with their expectations for future operational needs to determine which components to operate to produce the instructed MW.

With the Enhanced model of the current disclosure, the exemplary controller 10 applies its knowledge of market needs and configuration-based offers to optimize the commitment among several configurations representing the operation of different combinations of components. The exemplary controller 10 then dispatches using more accurate offer parameters representing the selected configuration. MPs will receive instructions of which configuration to operate ahead of real time with other resource commitment decisions and will be better able to follow dispatch with their operating characteristics more accurately considered.

In the exemplary model, starting from ALLOFF to any other configuration is analogous to the conventional start-up of a conventional unit. The appropriate hot, intermediate, or cold start-up cost is determined based on the applicable state (hot, intermediate, or cold) determined by the as-offered Hot-to-Cold or Hot-to-Intermediate time and how long the configuration has been offline (duration from the time the configuration was last online to the new start time). State dependent start-up times and start-up notification times are enforced to ensure the time required bring the unit online are achievable. Determination of warmth state and an example application of start-up and start-up notification time are demonstrated in FIG. 4-1.

The ECC model of the current disclosure introduces the new concept of transitions between online configurations.

Since transitions among online configurations are less variant by the states, one transition cost is modeled for each transition independent of states. Transition Time and Transition Notification Times will be enforced in unit commitment to ensure the time required for transitions between online configurations. During Transition Times, an ECC resource will be disqualified in RT from clearing ORs. Similar to prior art convention for start-up times indicating when the resource should be ready for dispatch, transition time of the current disclosure is treated as part of the "from" configuration since the resource is expected to complete the transition and be ready for dispatch in the "to" configuration by the instructed transition time. FIG. 4-2 shows an example of the application of transition parameters according to the current disclosure.

4.2 Commitment Between DA and RT

Conventionally, the prior art controller commits resources in the DA market and then normally commits additional resources in the RT market based on system needs through Forward and Intra-day Reliability Assessment Commitment ("RAC") and Look-Ahead Commitment ("LAC"), as shown in FIG. 4-3. LAC is a primary RT commitment tool especially for quick start resources. LAC has three major functions: make new commitment whose Startup+notification+ min run time≤LAC study window; extend prior commitments by DA/RAC/LAC; and de-commit RAC/LAC commitments that have met their min run times.

ECC modeling according to the current disclosure will enable least-cost commit and dispatch of the combined cycle resource in the most economic configuration in the DA market. Additionally, RAC and LAC RT commitment processes will evaluate ECC resources and may recommend transitions to higher configurations with increased configuration capacity based on anticipated RT operating conditions.

To accommodate the above operational needs, impacts have been carefully examined and the identified design needs are explicitly addressed. Moving into the Operating Day, the lead time to transition the ECC resources are eroding. Sufficient Transition Times and Transition Notification Times need to be enforced when RT transitions an ECC resource to a different configuration. Moreover, the RT commitment changes are made on top of commitment plan that has already been decided in DA or previous RT RAC/LAC cases, and their feasibility with the existing commitment plan should thus be maintained, e.g., minimum up time, minimum down time, maximum run time should be respected to maintain feasibility with the surrounding commitment plan made previously.

The following describes the commitment functionality needed to support changes to the planned schedule of transitions between configurations and focuses on the granular LAC process which runs every 15 minutes, but the concepts may be extended to other RAC studies as applicable. The major LAC functions needed to support ECC resources are: transitions up to a new configuration can be considered when Transition Time+Transition Notification Time of the new configuration+minimum run time of the new component≤LAC study window; extension of previously scheduled configurations from a prior DA/RAC/LAC commitment, including both extensions forward and/or backward in time; transition down from a RAC/LAC committed configuration; and transition down from DA committed configuration.

This last function to transition down from a DA committed configuration is driven by needs associated with DB scheduling and is a newly introduced to LAC. Eligibility criteria are thus carefully designed to address the operation needs while maintaining DA/RT consistency and limiting exposure to DA financially binding positions. Two eligibility criteria are established for the following considerations: Transition Time+Transition Notification Time+minimum run time of component to be taken off≤Threshold (e.g., LAC window); and Transition Time+Transition Notification Time of the configuration to be transition down+minimum down time of the component to be taken off≤Threshold (e.g., LAC window).

As shown in this "late start" example, the Transition Time and Transmission Notification Time plus minimum run time needs to fit in the LAC window for the later start of the higher configuration to be feasible or to enable LAC to evaluate the cancellation of the higher configuration.

As shown in the "early stop" example, the Transition Notification Time plus minimum down time of the higher configuration, e.g., 2×1-DB, needs to be fit into the LAC window to enable the ECC resource to return to the commitment plan of 2×1-DB outside the LAC window.

Based on these eligibility criteria, typically transitions down from DB mode will be allowed while transition down from other configurations may not be allowed based on their needed transition and minimum run times.

Based on schedule feasibility and the eligibility criteria for higher or lower capacity configurations relative to the scheduled configuration, some configurations may be eligible for commitment change consideration in the RAC/LAC study window. Specifically, to enable the commitment of a different configuration to support changing RT system conditions, the commitment decisions scheduled in commitment plan by previous commitment processes will be freed up as decision variables in LAC if they are eligible based on the criteria established above as illustrated in FIG. 4-7. Constraints will then be enforced to ensure any changes to the schedule have sufficient Transition Time and Transition Notification Time, satisfy min up/down time and Transition Time, and maintain feasibility with the commitment plan before and after the LAC study.

4.3 Economic Dispatch—Energy

Normally, the controller will dispatch a combined cycle resource using the offer parameters specified for the committed configuration to more accurately capture their operating limits, ramp rates, etc. Challenges arise from two situations: under rare circumstances, a resource may be operating under a different configuration than instructed; and resources can be less flexible during transition than is represented in a configuration offer for normal operation, i.e., outside a transition.

For the first challenge, the exemplary controller 10 will require new ICCP data communicating the ECC resource's "current configuration" (See Section 3.1). When the current configuration is inconsistent with the controller's instructed configuration per the commitment plan, the RT dispatch function, facing inconsistency in which configuration's offer curve to use, will echo back to State Estimator ("SE") MW.

For the second challenge, a similar resource controllability issue is experienced in the prior art during start-up. The conventional practice is to echo back the telemetered resource output MW when the resource is outside of the scheduled commitment plan and to ramp the resource toward Econ Min when the resource is within the commitment plan but for some reason is below Econ Min. Unlike start-up where the resource is online outside the scheduled commitment plan, ECC transitions according to the exemplary model occur within the scheduled commitment plan, and the exemplary controller treats the resource as available for dispatch. To examine different situations that may occur during a transition such as those in FIG. 4-8, designs for dispatch during transitions were developed for the DA, RT and AGC processes depicted in FIG. 4-9.

In the conventional model, MPs can send an off-control status (CMOD=3) if they are transitioning and are not able to follow dispatch, and the controller will echo back the telemetered output as the dispatch instruction.

In the DA market with an hourly interval, the resource will continue to be dispatched based on hourly offers like in the prior art.

The major changes for ECC resources, according to the current disclosure, are made in UDS, especially for the situation where there is a disparity band between the dispatch range of the "from" configuration and that of the "to" configuration. At a high level, a transition will be treated as occurring at the end of the "from" configuration's commitment period. If the resource's SE MW is within dispatch range and "current configuration" is consistent with commitment plan, the ECC resource will be dispatched using the offer curve of that configuration. If the resource SE MW is out of dispatch range or the current configuration is inconsistent with commitment plan, then UDS will echo back to the SE MW. Otherwise, the resource will be ramped toward dispatch limits. FIG. 4-10 demonstrates this rule for a downward transition scenario.

Example ECC Dispatch Logics During a Transition with Disparity Band According to the Current Disclosure The detailed RT dispatch logic is summarized in Table 4-1.

contingency reserves, i.e., OR, during at least part of a transition between configurations. An explicit reserve clearing model during transitions was developed to accommodate such operating characteristics. Grouping by the type of component starting during the transition, Table 4-2 summarizes typical times needed for transitions involving different types of component starts. Transitions that shutdown components typically have relatively small transition times.

TABLE 4-2

Surveyed Typical Times for Combined Cycle Resources to Complete a Transition based on Component Started

| Component Started | Transition Time (Hours) |
| --- | --- |
| CT | 1-4 |
| ST | Mostly cannot run w/o CT; 0.5 |
| DB | 0.2-1 |

In the exemplary model, additional logic will be added to RT dispatch and to the DA market to support the impact of transitions on the ability of ECC resources to provide OR. Additionally, a resource may indicate an off-control status (CMOD=3) on a 4-second basis to indicate that it cannot follow the controller's dispatch.

To support the RT UDS (5-minute) dispatch, the exemplary controller will require a new ICCP "transition status" flag specifying whether the resource is in transition. If the ICCP transition flag is set to 1 indicating the resource is transitioning or if the commitment plan indicates the resource is scheduled to be in transition, then UDS will not clear ORs from the resource. For example, if a transition with a 20-minute transition time is scheduled at 05:00, RT dispatch will not clear reserves on this ECC resource

TABLE 4-1

Energy Dispatch Logic for an ECC Resource

| Row # | Plan | ICCP Config | ICCP transition | Dispatch Logic |
| --- | --- | --- | --- | --- |
| 1 | Config_1 - not transit | Config_1 | Not transit | If SE outside dispatch range, ramp toward dispatch limits, otherwise dispatch under Config_1 |
| 2 | Config_1 - in transit | Config_1 | In transit | If SE outside dispatch range, echo back SE, otherwise dispatch under Config_1 (example) |
| 3 | Config_2 - not transit | Config_2 | Not transit | If SE outside dispatch range, ramp toward dispatch limits, otherwise dispatch under Config_2 |
| 4 | Config_1 - not transit | Config_1 | In transit | If SE outside dispatch range, ramp toward dispatch limits, otherwise dispatch under Config_1 |
| 5 | Config_1 - in transit | Config_1 | Not transit | If SE outside dispatch range, echo back SE, otherwise dispatch under Config_1 |
| 6 | Config_2 - not transit | Config_2 | In transit | If SE outside dispatch range, ramp toward dispatch limits, otherwise dispatch Config_2 (example) |

When UDS echo back to SE MW, the five-minute UDS dispatch target will be set at the initial SE MW input to the case. UDS will also send a flag to AGC to set the four-second AGC set-point based on the latest telemetered MW. In such situations, the settlement implications will be guided by the conceptual principle that when a resource should be eligible to be made whole if it follows Real Time Offer ("RTO") commitment and dispatch instructions. Detailed eligibility rules will be finalized during solution design.

4.4 Economic Dispatch—OR

According to a survey of combined cycle owners, most combined cycle resources cannot provide regulation or between 04:40 and 05:00 due to the transition scheduled in the commitment plan. Additionally, if the ICCP "transition status" flag indicates the resource is in transition outside the scheduled 04:40-05:00, the ECC resource will also not be cleared for reserves during these intervals.

In the DA market, to strike the balance between the offered Transition Time and clearing ORs in an hourly interval, an eligibility cutoff time threshold will be established to determine whether a resource may be selected to clear reserves based on the time the resource is scheduled to be transitioning during an hour. Based on a survey of MP inputs and other RTO practices, the eligibility cutoff is set to be 0 minutes for regulation and 30 minutes for contingency reserve. The DA market regulation cutoff reflects the RT hourly regulation selection process which will avoid selection of resources transitioning during the operating hour. The regulation cutoff will be updated accordingly if the RT regulation selection process changes. An ECC resource will not be selected to clear contingency reserve for the hour if a scheduled transition overlaps half or more of the hour. Consistently, other forward-looking processes such as RAC and LAC will apply similar rules that the resource will not be selected to clear contingency reserve in an interval if the resource's scheduled transitions overlap with half or more of that study interval, and the resource will not be selected for regulation clearing in any operating hour which overlaps with a scheduled transition. Because of the different OR clearing rules in the DA and the RT markets, settlement provisions will be developed to appropriately account for the reserve buy-back cost when an ECC resource cannot fulfill its DA reserve position because the controller 10 has instructed it to be in a scheduled transition. For example, a resource takes 20 minutes to transition between 04:40 and 05:00. The DA market can clear spinning reserve from the resource in HE 5 since the overlapping transition time is less than the eligibility cutoff of half of the hourly interval. In the RT market, the resource will not clear the spinning reserve in the Real-Time market from 04:40 to 05:00 and will have to buy-back the DA position.

4.5 Operation of DB

MPs experience difficulties in managing the use of DBs with the prior art aggregate combined cycle model. Many combined cycle resources can transition in and out DB operation quickly (typically ~10 minutes), and some have minimum up times and minimum down times of about 2 hours. Once DB has been started, the resource usually has limited dispatch range and ramping capability and has to stay for at least the DB minimum run time before the DBs can be turned off. As a result, if a resource starts its DBs but changing RT conditions do not support their use, the resource will be uneconomically stranded in DB operation for the DB minimum run time. The uneconomic use of DBs may also impact the controller's reliability since the combined cycle resources normally have higher ramp rates and larger dispatch ranges when not using DBs. FIG. 4-11 illustrates the situation where the DB capacity committed DA is economic or non-economic. The line 410 represents the ECC operating range with the 2×1-DB configuration, and area 412 is the ECC dispatch range with the 2×1 configuration. To meet system demands at the first peak, the DB is turned on and is supported by RT prices. DB is again turned on anticipating the second peak, which may not materialize such as reflected by the RT prices depicted in line 414. If the resource is not allowed to transition out of the 2×1-DB configuration based on the latest RT conditions, the resource will be stranded with increased high-cost output with little or no downward dispatch range. Conventionally, if a resource decides to transition out of DB as shown in dashed line 416 with area 418 below indicating the large dispatchable range, but volatile RT prices do indeed rise later, the resource will have to buy-back its DA position at the high RT prices represented by dashed line 420.

With the exemplary model, the use of DBs will be able to be offered as a separate configuration (e.g., 1×1-DB, 2×1-DB) with its own ramp rate, Econ Min, Econ Max, and other offer parameters. MPs can also specify the minimum run time of the DBs. These parameters will be considered by the controller's market clearing processes. The UDS should respect the DB configuration's Econ Min, Econ Max, ramp rates, and other parameters and will more accurately capture the resource's operating constraints in the dispatch instructions. The DA and RAC processes, which use SCUC, should also evaluate future system conditions and account for DB minimum run times. DB configurations should only be committed when warranted by anticipated conditions over at least the minimum run time. Further, if RT conditions change from those anticipated in the DA, RAC processes, including LAC, will be able to economically replace a previously committed DB configuration with a configuration without DBs. Settlement provisions should be developed to address any eroded DA margin as discussed in Section 5.

4.6 Emergency Operating Conditions

In the anticipation of a tightening supply margin, appropriate modeling and operation of ECC resources under Emergency Conditions will be important. Currently, conventional controllers model resources during Emergency Conditions with: Emergency dispatch range—Emer Min≤Econ Min≤Econ Max≤Emer nMax; and Emergency commitment status—Resource can only be committed during Emergency conditions.

With the ECC model of the current disclosure, the emergency operating range will be offered for each configuration by specifying the Minimum and Maximum Emergency operating limits. If a configuration can only be operated under emergency conditions, the configuration can be offered as emergency only by specifying its Commitment Status as Emergency. MPs will ensure that transitions associated with a configuration with an Emergency Commitment Status offer will not effectively isolate valid economic configurations under non-emergency conditions.

With the capability to operate under emergency conditions appropriately modeled, the combined cycle resources will be committed and dispatched accordingly: Maximum Generation Emergency—transition ECC to high configurations and/or dispatch within its emergency range as needed; and Minimum Generation Emergency—transition ECC to any lower configurations, including ALLOFF, supported by available transitions and/or dispatch within its emergency range as needed. (Currently, resources can be turned off as needed or dispatched within their emergency ranges under Minimum Generation Emergency conditions)

5. Settlement

Conventionally, combined cycle resources under the aggregate model are settled at the combined cycle resource level. With their offer costs structured like other resources including start-up and no-load costs, energy and reserve costs, make whole payments are evaluated similarly. That is, DA RSG) makes whole for DA commitment costs, RT RSG for RT commitment costs, DAMAP and RTORSGP for resources committed in DA but dispatched differently in RT. With the exemplary ECC model of the current disclosure, settlement will continue to be performed at the combined cycle resource level. However, given the significant changes of offer structure and market clearing as discussed in previous sections, make whole payment changes are provided for two new features of ECC resources, 1) offer structure changes including product offer costs varying by configuration and the introduction of Transition Costs and 2) DA and RT overlapping commitments due to RT changes in the committed configuration, e.g. a 1×1 DA committed configuration being changed to 2×1 for RT.

5.1 Overview of MWP According to the Exemplary Embodiments

For ECC resources, MWPs are developed based on the underlying cost causation while maintaining consistency with the settlement process for conventional resources to the extent possible. That is, revenue sufficiency is guaranteed to the offered production costs resulting from the controller's commitment and dispatch instructions and DA margins eroded by following the controller's instructions are preserved. At a high level, the MWPs for ECC resources are as follows: DA RSG will continue to make-whole to DA commitment and dispatch costs, with modifications to include transition costs and to use the offer of the committed configuration in each interval; when RT retains a DA committed configuration, increased dispatch costs will continue to be recovered via RTORSGP and eroded DA margin through DAMAP; and when RT changes a DA committed configuration, DAMAP and RT RSG will be leveraged to compensate increased commitment/dispatch costs and/or eroded DA margin.

The MWPs can be further illustrated considering two dimensions: the cost components and the time periods. In the dimension of cost components, DA RSG will make whole to Start-up and Transition Costs, No-Load Costs, Energy and Reserve Costs incurred in the DA market. RT RSG will compensate the incremental Startup and Transition Costs, No-Load Costs, Energy and Reserve Costs incurred in the RT. A netting approach summarized in Table 5-1 is used to determine the costs resulting from the RTO RT commitment and dispatch by identifying the difference between the RT market costs and those already incurred in the DA market. DAMAP and RTORSGP evaluate the buy-back cost or the additional generation cost of energy and reserves. It should be noted that for those periods when RT changes the DA committed configuration, commitment decisions costs including transition costs and changes in configuration offer data are involved in addition to the traditional costs of incremental dispatch quantities. In recognition of the commitment decision impacting multiple time periods, the eroded margin will be calculated through DAMAP and then rolled into RT RSG to evaluate the RT MWPs over the whole RT commitment period.

In the dimension of time periods (see FIG. 5-1), DA RSG will be calculated for DA commitment periods; and RT RSG generally evaluates RT commitment periods. An enhancement for considering the ECC resource costs is for the RT RSG startup and transition costs to be evaluated for the contiguous DA and RT commitment periods. Conventionally, with a simple on/off commitment, an adjacency rule is used to determine which startup costs should be included in RT RSG. With the ECC model of the exemplary embodiment, where commitments of up to seven configurations (or more, depending upon computing resources) and transitions costs introduce complications and the adjacency rule could be very complicated. A systematic netting approach is thus used over the contiguous commitment block as an enhanced version of conventional adjacency rule to determine which startup and transition costs should be included in RT RSG.

DAMAP will continue to be evaluated for any hour with a DA position. However, considering that under the ECC model a DA commitment configuration can be changed to a different configuration in RT, a differentiation is made for these hours with a DA position. That is, for hours when RT retains a DA committed configuration, DAMAP and RTORSGP will be used to evaluate the eroded DA margin and the increased dispatch costs, respectively. For hours when RT changes a DA committed configuration, DAMAP will be used to evaluate eroded DA margin and then rolled into RT RSG combining with the increased commitment/dispatch costs to determine the RT MWP across the RT commitment period.

RTORSGP will be evaluated in intervals in which the DA committed configuration is retained in the RT commitment schedule.

In the following sections, different types of MWPs will be discussed in detail including DA RSG and RTORSGP that are similar to conventional calculations for conventional units and DAMAP and RT RSG that are modified to account for the additional complications of the exemplary ECC model. The design will first consider the RTO initiated commitment and dispatch assuming MPs do not change their offers. MP initiated self-commitment or must run and MP initiated offer changes will be consider at the end.

5.2 DA RSG, RTORSGP, and DAMAP-I According to Exemplary Embodiments

As overviewed, DA RSG will continue to make-whole to DA commitment and dispatch costs, with modifications to include transition costs. When RT retains a DA committed configuration, any increased dispatch costs will continue to be recovered via RTORSGP and eroded DA margin through

TABLE 5-1

Cost Calculations in ECC MWP

| | DA MWP Costs | RT MWP Costs | |
| --- | --- | --- | --- |
| Cost Type | DA RSG | RT RSG | DAMAP/RTORSGP |
| Startup & Transition costs | DA committed Startup + Transition Cost | RT Startup + Transition Cost − [DA Startup + Transition Cost] | NA |
| No-Load costs | DA committed No-Load Cost | RT No-Load Cost − DA No-Load Cost | NA |
| Energy costs | Area under DA committed curve to DA MW | Area under RT curve to RT MW − Area under DA curve to DAMW | Area under RT curve to RT MW − Area under DA curve to DAMW |
| Reserve costs (sum over types) | DA committed offer × DA Reserve MW | RT offer × RT Reserve MW − DA offer × DA Reserve MW | RT offer × RT Reserve MW − DA offer × DA Reserve MW |

DAMAP. These MWPs are very similar to the conventional approach.

Example 5.2-1 DA RSG Calculation

Consider an ECC resource that is committed with 1×1 and 2×1 configurations as depicted in FIG. 5-2. The commitment schedule for the 1×1 and 2×1 configurations is illustrated as shading 500 and 502 for DA and RT commitments, respectively. In the DA schedule 500, the ECC resource was scheduled for two separate commitment periods in the 1×1 configuration: HE 5 through HE 9 and HE 16 through HE 21. Subsequent examples will investigate the RT commitment 502 which connects and overlaps the two DA commit periods with a 2×1 commitment. DA RSG calculations are associated with the DA commitment periods as outlined by the box 504. (The box 504 indicates that calculation changes to support ECC resources are mechanical to support ECC structural changes rather than a red box later in the next subsection indicating that more extensive approach changes are required.) The other types of WMPs and their associated time periods will be investigated in subsequent examples.

Its offer data related to the configurations and transitions are summarized in Table 5-2. For simplicity, each configuration's energy offer curve is a single block price (from 0 to configuration maximum).

TABLE 5-2

DA RSG Example Offer Data

| | 1 × 1 | | 2 × 1 | |
|---|---|---|---|---|
| Configuration Data | | | | |
| Startup Cost (intermediate) | 15000 | | 30000 | |
| No Load Hourly Cost | 1500 | | 3000 | |
| Energy Curve (MW - $/MWh) | [160, 245] | 20 | [350, 525] | 25 |
| Reg Price | 10 | | 10 | |
| Spin Price | 1 | | 1 | |
| Cleared MW & hourly cost* | 200 | 4000 | 450 | 11250 |
| Cleared Reg MW & hourly cost | 35 | 350 | 40 | 400 |
| Cleared Spin & hourly cost | 10 | 10 | 35 | 35 |
| Transition Costs | | | | |
| 1 × 1 --> 2 × 1 Transition | 15500 | | | |
| 2 × 1 --> 1 × 1 Transition | 0 | | | |

Costs to be covered by DA RSG are calculated as described in Table 5-3.

TABLE 5-3

ECC Resource Cost Calculation for DA RSG

| | | DAY AHEAD RSG COSTS |
|---|---|---|
| 1st DA Commitment | | |
| SU + Transition costs | 1 × 1 start at 04:00 | 15000 |
| NL costs | 1 hours 1 × 1 no load cost - no RT overlap | 1500 |
| | 4 hours 1 × 1 no load cost - RT overlap | 6000 |
| Energy Offer Curve costs | 1 hours 1 × 1 cleared at 200 MW - no RT overlap | 4000 |
| | 4 hours 1 × 1 cleared at 200 MW - RT overlap | 16000 |
| Reserve Costs | 1 hours 1 × 1 35 MW regulation - no RT overlap | 350 |
| | 4 hours 1 × 1 35 MW regulation - RT overlap | 1400 |
| | 1 hours 1 × 1 10 MW spin - no RT overlap | 10 |
| | 4 hours 1 × 1 10 MW spin - RT overlap | 40 |
| | Day Ahead | 44300 |
| 2nd DA Commitment | | |
| SU + Transition costs | 1 × 1 start at 15:00 | 15000 |
| NL costs | 3 hours 1 × 1 no load cost - RT overlap | 4500 |
| | 3 hours 1 × 1 no load cost - no RT overlap | 4500 |
| Energy Offer Curve costs | 3 hours 1 × 1 cleared at 200 MW - RT overlap | 12000 |
| | 3 hours 1 × 1 cleared at 200 MW - no RT overlap | 12000 |
| Reserve Costs | 3 hours 1 × 1 35 MW regulation - RT overlap | 1050 |
| | 3 hours 1 × 1 35 MW regulation - no RT overlap | 1050 |
| | 3 hours 1 × 1 10 MW spin - RT overlap | 30 |
| | 3 hours 1 × 1 10 MW spin - no RT overlap | 30 |
| | Day Ahead | 50160 |
| | Total Cost considered in DA RSG | 94460 |

Example 5.2-2 RTORSGP and DAMAP when RT Retains a DA Configuration

In Example 1, suppose in RT, the resource retains the DA committed 1×1 configuration at HE 5 and 19-21, but dispatch MW is changed in HE 5 and 20-21 as listed in Table 5-4. RT HE 19 dispatch is assumed to remain at 200 MW as cleared in the DA market. When RT retains the DA configuration, HE 5 and 19-21 in this example as shown in FIG. 5-1, the evaluation of RTORSGP and DAMAP for ECC resources will be similar to the corresponding calculations for conventional units.

TABLE 5-4

RT Dispatch Changes from DA Awards

|  |  |  |  |
|---|---|---|---|
|  | DA awarded MW & hourly cost | 200 MW | $4,000 |
| Hour 5 (Dispatch up) | Cleared MW & hourly cost RT LMP | 210 MW | $4,200 $18/MWh |
| Hour 20-21 (Dispatch down) | Cleared MW & hourly cost RT LMP | 190 MW | $3,800 $24/MWh |

RTORSGP and DAMAP are both $0 for Hour 19 since there are no output MW changes. RTORSGP and DAMAP will be used to make whole to the additional dispatch cost in Hour 5 and the buy-back cost at Hours 20-21. The RTORSGP and DAMAP calculations are shown in Table 5-5.

TABLE 5-5

Example of RTORSGP and DAMAP-I Calculations

|  |  | Total |
|---|---|---|
| Hourly RTORSGP (Hour 5 Example) |  |  |
| Energy above DA MW |  | 10 |
| 1 hour DA energy MW | 200 |  |
| 1 hour RT energy MW | 210 |  |
| Energy Cost above DA position |  | 200 |
| 1 hr 1 × 1 DA energy cost (200 MW) | 4000 |  |
| 1 hr 1 × 1 RT energy cost (210 MW) | 4200 |  |
| Energy Revenue above DA position |  | 180 |
| 1 hour Energy above DA * RT LMP | 180 |  |
| Hourly RTORSGP Payment to Unit |  | 20 |
| Hourly DAMAP (Hour 20, 21 Example) |  |  |
| Energy below DA MW |  | 10 |
| 1 horn DA energy MW | 200 |  |
| 1 hour RT energy MW | 190 |  |
| Energy Cost savings |  | 200 |
| 1 hr 1 × 1 DA energy cost (200 MW) | 4000 |  |
| 1 hr 1 × 1 RT energy cost (190 MW) | 3800 |  |
| Energy Buy-Back below DA position |  | 240 |
| 1 hour Energy below DA * RT LMP | 240 |  |
| Hourly DAMAP Payment to Unit |  | 40 |

5.3 DAMAP-II and RT RSG According to Exemplary Embodiments

As introduced at the beginning of this section, the major challenge to make whole calculations for ECC resources occurs during the overlapping commitment periods when RT changes a DA committed configuration. It is not new for a resource to be dispatched and output at different levels between the DA and the RT markets. However, it is unique to the new ECC model that the different output levels are associated with commitment and transition decision changes coupled across the whole commitment period, as well as with the dispatch decisions. The different DA and RT configurations also involve different offer curves that will require adjustments in the MWP calculations. Furthermore, the reserve clearing logic developed in the previous section during transitions also introduces reserve buy-back needs. For example, DA may have scheduled a transition but still cleared reserves for the hour if the transition time was less than the eligibility cutoff or DA did not have a transition scheduled but RT initiated a transition that overlaps with DA cleared OR. It is also possible that a resource cleared reserves in DA but a different RT-committed configuration, e.g., 2×1-DB, may be unable to provide reserves.

When RT changes a DA committed configuration, a "Roll DAMAP into RT RSG" approach is developed to ensure that costs incurred in RT commitment periods are recovery through RT RSG and meanwhile buy-back costs incurred during the overlapping commitment periods are preserved to the DA margin through DAMAP.

In FIG. 5-3, the box 510 shows that the RT RSG start-up and transition cost calculation, the RT RSG no-load calculation and the RT RSG energy and OR costs in hours not overlapping DA commitments are philosophically similar to their corresponding calculations for conventional units. The major changes calculations occur in the boxes 512 for RT RSG energy and OR costs and for DAMAP in hours where RT committed configurations differ from overlapping DA committed configurations.

The RT RSG start-up costs, transition costs and no-load costs can be evaluated using the netting approach described in Table 5-1 as illustrated in Example 3.

Example 5.3-1 Start-Up, Transition and No-Load Cost Calculation in RT RSG

Use the same offer parameters and commitment schedule as described in Example 1. Start-up and transition costs are calculated over the contiguous DA and RT commitment block (HE 5 through 21) and are then netted with the DA startup and transition costs in Table 5-3 associated with Example 1. In this example, The RT schedule consists of a 1×1 start at 04:00 ($15,000), a transition from 1×1 to 2×1 at 05:00 ($15,500), and a transition from 2×1 to 1×1 at 18:00 ($0) and results in a total start-up and transition cost of $30,500. The DA scheduled consisted of 2 1×1 intermediate starts ($15,000 each) totaling $30,000. The net RT RSG start-up and transition costs are calculated as $30,500−$30,000=$500. The RT RSG start-up and transition costs may be a negative number.

As shown in FIG. 5-3, No-load costs are calculated over the RT commitment periods (periods retaining their DA committed configuration with no overlapping RT commitment are not included) and are then netted by with the $10,500 of DA no-load costs from intervals from both DA commitments overlapping with RT commitments as reported in Table 5-3. The RT and netted RT RSG start-up and transitions costs and no-load costs for this example are summarized in Table 5-6.

TABLE 5-6

ECC Resource Start-up, Transition and No-load Cost Calculation for RT RSG

| REAL TIME RSG COSTS |  | RT-DA |
|---|---|---|
| 1 × 1 start at 04:00 | 15000 | 500 |
| 1 × 1-->2 × 1 Transition at 05:00 | 15500 |  |

TABLE 5-6-continued

ECC Resource Start-up, Transition and
No-load Cost Calculation for RT RSG

| REAL TIME RSG COSTS | RT-DA | |
|---|---|---|
| 2 × 1-->1 × 1 Transition at 18:00 | 0 | |
| 13 hours 2 × 1 no load cost | 39000 | 28500 |

The major change is the calculation of RT RSG energy and reserve costs for ECC resources. Conventionally, RT RSG only applies to RT committed units which generally do not have a DA position according to the conventional commitment process, and the RT RSG only needs to compensate the additional costs incurred in RT. For resources who have a DA position, RTORSGP and DAMAP are used to make whole to the additional dispatch cost if output more MW in RT and to the DA margin if output less MW, respectively. The exemplary ECC model of the current disclosure does not fit into conventional RT RSG during the overlapping commitment periods, because during these periods, an ECC resource can be committed to a different configuration in RT while it has a DA position. It also does not fit into conventional RTORSGP or DAMAP because when the resource output differently than its DA MW, there are costs associated with not only dispatch decisions but also commitment decisions coupled across multiple commitment periods. The reserve and energy buyback issues add to the complications. A "Roll DAMAP into RT RSG" approach is developed to address the challenges introduced by the ECC model while leveraging conventional practices.

To evaluate the energy and reserve cost, the RT RSG concept is used to evaluate the uncovered cost if output more MW is higher in RT than was awarded in DA and DAMAP concept is used to evaluate the eroded DA margin if output MW is less. Not considering MP initiated offer changes for now, a uniform formulation for the RT MWP contribution from each product (RT MWP_PROD) achieves both purposes:

RT MWP_PROD$_i$=(RT MW−DA MW)×RT Price−
($\int_0^{RTMW}$Offer_Cost−$\int_0^{DAMW}$Offer_Cost)

By summing the above over all products and across the intervals (i) in the RT commitment period and by adding back startup, transition, no-load costs, the total RT MWP is obtained RT MWP=Min{0,$\Sigma_{prod}\Sigma_{i=1}^{N}$[RT MWP$_{PROD_i}$]/12−
StartupTransition Costs−Noload Cost where "i" is the index of time periods and "N" is the number of periods that are eligible across the RT commitment period.

Illustration of Energy and Reserve Costs by RT RSG and DAMAP

Cost Recovery for Energy Through RT RSG

Looking at a single interval in which the exemplary ECC resource was committed in the 1×1 configuration in DA and 2×1 configuration in RT, FIG. 5-4 shows the incremental costs and revenues for DA and RT dispatch. The area 520 represents money stream going out of MP and the area 522 represents money stream going into the MP. The RT costs are calculated as the incremental RT 2×1 configuration costs above the DA 1×1 configuration costs for the DA cleared MWs as shown in 520. RT revenue is calculated for the RT MW difference from the cleared DA MWs paid by RT LMP. Contribution from energy to RT MWP, i.e., RT RSG when higher MW in RT, is the difference between areas 520 and 522.

Preserve DA Margin for Reserve Buyback

FIG. 5-5 shows the regulation contribution to the RT MWP for a transition interval in which the resource has to buyback the 35 MW DA position followed by 0 MW clearing in RT. In this case, the buyback cost is money stream going out of MP as shown in 530, while the avoided cost by producing less MW can be viewed as money stream going into the MP as shown in 532. Contribution from regulation to RT MWP, i.e., DAMAP when lower MW in RT, is the difference between the areas 530 and 532.

Energy Buyback when Transition Down from 2×1-DB in DA to 2×1 in RT

Buyback needs can also arise for energy. FIG. 5-6 depicts two scenarios of RT prices when a resource as transition down to 2×1 from a DA 2×1-DB configuration: one when the RT price is below the incremental costs ($20/MWh) and one with RT above the incremental costs ($50/MWh). In general, the transition down will avoid the uneconomic operation of 2×1-DB and result in more cost savings in scenario one. In case RT prices unexpectedly rise later and the resource needs to buyback at high RT LMP, DAMAP will evaluate the eroded DA margin as the difference between the areas 530 and 532 in scenario two.

Example 5.3-2 Roll DAMAP into RT RSG to Calculate RT MWP

This example looks at how the energy and reserve contributions as represented by DAMAP and RT RSG in each interval are rolled together across products and the RT commitment periods, and combined with no-load, start-up, and transition costs to evaluate the overall RT MWP. Consider an ECC resource that is committed with 1×1, 2×1 and 2×1-DB configurations as below in FIG. 5-7. In this figure, the arrows 540 indicate periods of transition from one configuration to another since the transitions are expected to occur at the end of the "from" configuration prior to attaining the "to" configuration.

Its offer data related to the configurations are summarized in Table 5-7.

TABLE 5-7

Rolling DAMAP into RT RSG Example Costs

| Configuration Data | 1 × 1 | | 2 × 1 | | 2 × 1-DB | |
|---|---|---|---|---|---|---|
| Startup Cost (intermediate) | 15000 | | 30000 | | 35000 | |
| No Load Hourly Cost | 1500 | | 3000 | | 3500 | |
| Energy Curve (MW - $/MWh) | [160, 245] | 20 | [350, 525] | 25 | [565, 565] | 30 |
| Reg Price | 10 | | 10 | | NA | |
| Spin Price | 1 | | 1 | | NA | |
| Cleared MW & hourly cost * | 200 | 4000 | 450 | 11250 | 565 | 16950 |

TABLE 5-7-continued

| Rolling DAMAP into RT RSG Example Costs | | | | | | |
|---|---|---|---|---|---|---|
| Configuration Data | 1 × 1 | | 2 × 1 | | 2 × 1-DB | |
| Cleared Reg MW & hourly cost | 35 | 350 | 40 | 400 | NA | NA |
| Cleared Spin & hourly cost | 10 | 10 | 35 | 35 | NA | NA |

Again in this example, offer data per configuration are assumed the same between DA/RT, i.e., there are no MP initiated offer changes. Suppose the transition time is 30 minutes for all transitions and transition costs are shown in Table 5-8:

TABLE 5-8

| Rolling DAMAP into RT RSG Example Transition Costs Transition Costs | |
|---|---|
| 1 × 1-->2 × 1 | 15500 |
| 2 × 1-->1 × 1 | 0 |
| 2 × 1-->2 × 1-DB | 3000 |

The combined resources transitioned from 2×1 to 2×1-DB in HE 7 creating an overlapping 1×1 commitment in DA. FIG. 5-8 shows the 5-minute dispatch schedule and prices for intervals HE 7. Suppose there is minimal variation in the clearing prices and ECC resource dispatch to simplify the example. A normal operating hour would be expected to have much more variability. With a 30-minute transition in the operating hour, the ECC resource is not selected for regulation for the entire hour and contingency reserves are not cleared during the transition in the second half of the hour. The example will focus on detailed calculations of interval ending 6:05 exemplifying an overlapping commitment with different DA/RT configurations and interval ending 6:50 exemplifying contingency reserve buyback in of a DA position.

As developed earlier, the same formula of RT MWP_PROD$_i$ is used to evaluate energy and reserve costs of RT RSG if output more and buyback costs of DAMAP if output less.

Interval 6:05—Overlapping DA/RT commitment is shown in FIG. 5-9.

Interval 6:50—Reserve Buyback during Transition is shown in FIG. 5-10.

Similarly, this calculation is repeated for all 5-minute intervals in the RT commitment periods such as those shown in FIG. 5-11 for 6:00 through 6:55. Aggregating over the RT commitment periods, the energy and reserve costs to be considered in RT MWP is RT MWP$_{e,r}$=$\Sigma_{prod}\Sigma_{i=1}^{n}$[RT MWP_PROD$_i$]/12=-\$359.

Adding the no-load and startup and transition costs to the -\$359 energy and reserve costs, the total RT MWP is Min {0, -\$359-\$29500-\$3500}=-\$33,359.

Non-overlapping commitment periods will be settled like the conventional approach, including hours with a DA position and hours with transition. Transition intervals may not be eligible for MWP due to possibly off-control status or un-instructed deviation. Eligibility rules ensure that resources are eligible for cost recovery during the controller's scheduled transition over the as-offered transition time.

Example 5.3-3 Settlement During Non-Overlapping Hours with Scheduled Transition

In the above Example, HE 5 is a RT commitment period non-overlapping with DA and has a scheduled Transition up for intervals 4:35-5:00. HE 5 will be settled similar to the conventional approach with additional dispatch costs compensated by RTORSGP and eroded DA margin compensated by DAMAP for the hour as below, subject to eligibility criteria including additional criteria for ECC to be developed at solution design phase. FIG. 5-12 summarizes the DAMAP calculation HE 5 similar to the conventional approach to compensate the reserve buyback when the RT transition prevents regulation from clearing the whole hour and spinning reserve from clearing in half of the hour. Note that the additional arrows 550 in this diagram represent hours in which reserve buyback is required due to commitment of a configuration not able to provide reserve in a time period with a DA reserve position. The DAMAP payment for this hour is zero since the sum of the RT MWP amounts of the 5-minute intervals in HE 5 is positive indicating additional margin resulting from RT dispatch.

The "Roll DAMAP into RT RSG" approach can also support preserving DA margin when, e.g., in RT an ECC resource is committed to a lowered configuration than DA, or it is committed to a higher configuration than DA but is dispatched down.

Example 5.3-4 Settlement when ECC is in DB in DA and is Transitioned Out in RT

Consider a similar ECC resource with slightly different Econ Min of the 2×1 configuration shown in red in Table 5-9.

TABLE 5-9

| ECC Resource Offer Data for Example 5.3-4 | | | | | | |
|---|---|---|---|---|---|---|
| Configuration Data | 1 × 1 | | 2 × 1 | | 2 × 1-DB | |
| Startup Cost (intermediate) | 15000 | | 30000 | | 35000 | |
| No Load Hourly Cost | 1500 | | 3000 | | 3500 | |
| Energy Curve (MW - \$/MWh) | [160, 245] | 20 | [180, 525] | 25 | [565, 565] | 30 |
| Reg Price | 10 | | 10 | | NA | |
| Spin Price | 1 | | 1 | | NA | |
| Cleared MW & hourly cost * | 200 | 4000 | 450 | 11250 | 565 | 16950 |
| Cleared Reg MW & hourly cost | 35 | 350 | 40 | 400 | NA | NA |
| Cleared Spin & hourly cost | 10 | 10 | 35 | 35 | NA | NA |

The resource is committed into 2×1-DB in DA but, as shown in FIG. 5-13, is transitioned out of 2×1-DB to the 2×1 configuration in accordance with the latest expectations for RT system conditions in HE8 and HE9.

The "Roll DAMAP into RT RSG" approach can be applied to evaluate the energy and reserve costs for each 5-minute interval of the RT commitment period such as those shown in FIG. 5-14 when the 2×1-DB is transitioned down to the 2×1 configuration.

More specifically for example, interval 7:50 and 8:10 are illustrated in FIG. 5-15.

Even if RT is committed to a higher configuration than DA, the energy buy-back could still be needed. For example, at HE 6, the resource is committed in 1×1 in DA and is changed to 2×1 in RT, where 1×1 and 2×1 have overlapping dispatch ranges. It is possible that the resource clears less energy in RT than DA in intervals when it is more profitable to provide other products or the RT supply is abundant for a short time period.

5.4 Self-Commit and Offer Changes

MWPs discussed above have assumed no MP initiated commitment or offer changes. Under the current market rules, MPs can initiate self-commitment (must-run) and are able to change their offers between DA and RT until 30 minutes before the operating hour in RT. This section of the exemplary design will account for MP initiated commitment or offer changes.

MPs selecting Must-Run (Self-Commit) status designate the resource's configuration and commitment period and make the resource available for dispatch by the exemplary controller. MPs that Must-Run their resource forfeit guarantees for commitment related costs (i.e., start-up, transition, and/or no-load costs). For self-committed ECC resources, their DA RSG payment and RT RSG payments should follow the following principles: DA RSG payment includes the start-up and transition cost difference between the DA must-runs and the DA schedule; and RT RSG payment includes the start-up and transition cost difference between the combined DA schedule plus RT must-runs and the RT schedules.

The start-up and transitions costs can be negative (a cost savings) for either the DA RSG or RT RSG.

Based on these principles, the netting approach developed earlier for ECC resources can be extended for start-up and transition cost calculations to include consideration of MP initiated configuration must-runs as shown in Table 5-10.

TABLE 5-10

Start-up and Transition Cost Calculations
with Participant Must-Runs

| Cost Type | DA MWP Costs | RT MWP Costs |
|---|---|---|
| Startup & Transition costs | DA committed Startup + Transition Cost − [DA must-run Startup + Transition Costs] | RT schedule Startup + Transition Costs − [combined DA committed and RT must-run Startup + Transition Costs] |

No-load costs will not be considered for Must-Run hours, while dispatch costs may be eligible under RTORSGP provisions if an ECC resource is dispatched above Economic Minimum but the cost incurred cannot be fully recovered by prices.

Since the self-committed resources are available for the controller's dispatch, RTORSGP will continue to compensate dispatch costs of Resources that are not otherwise eligible for a RT RSG consideration, including RT must-run resources/configurations. DAMAP will continue to compensate resources that have a DA position, excluding resources that RT must-run to a different configuration.

Example 5.4-1 DA RSG and RT RSG Cost Calculation for Self-Commit ECC

Suppose the start-up and transition offer parameters are as described in Table 5-11.

TABLE 5-11

Start-up and Transition Offers

|  |  | Offer Cost ($) |
|---|---|---|
| Start-up | 1 × 1 | 17,000 |
|  | 2 × 1 | 30,000 |
| Transition | 1 × 1 --> 2 × 1 | 15,500 |
|  | 2 × 1 --> 1 × 1 | 100 |

Applying the must-run netting approach to obtain the DA RSG start-up and transition cost component, consider an example in which the MP must-runs (self-commits) the 2×1 configuration for HE 16 through 19 as shown in FIG. 5-18. This initial self-commit schedule includes one start-up in a 2×1 configuration with a scheduled start-up and transition cost of $30,000. FIG. 5-18 also shows that in the DA market the exemplary controller decided to extend the commitment earlier and later than the MP specified must-run period using the 1×1 configuration. The start-up and transition cost of the DA schedule includes a 1×1 start ($17,000), a transition from 1×1 to 2×1 ($15,500), and a transition from 2×1 to 1×1 ($100) with total start-up and transition costs of $32,600. The DA RSG start-up and transition cost component is the difference of $2,600. That is, the DA schedule determined by the exemplary controller cause an increase in the start-up and transition costs by $2,600 which is the amount eligible for consideration in DA RSG. The DA RSG start-up and transition cost component may be negative is some scenarios.

The netting approach above is able to address the relatively more complicated cost causation for ECC resources, while maintain consistency with conventional adjacency rules for conventional resources as shown in FIG. 5-19.

FIG. 5-20 continues the DA example with some additional RT self-commitments. The process for determining the start-up and transition in RT RSG is similar to DA. The RT must-run start-up and transition costs are subtracted from the final RT schedule start-up and transition costs to determine what is eligible for consideration in RT RSG.

Similarly, the calculation is consistent with the conventional practice for conventional resources as shown in FIG. 5-21.

For MP initiated offer changes, different types of MWPs have been examined. Similar to MP initiated offer changes in conventional design, DAMAP is the main calculation impacted by MP initiated offer changes. To adjust DAMAP to account for MP initiated offer changes for ECC resources, DAMAP's fundamental economic principle is examined first—to preserve DA margin when the exemplary controller changes commitment/dispatch in RT. That is, DAMAP makes up the difference between DA margin and RT margin if RT margin is less than DA margin. When there are MP changed offers, re-evaluate the difference between DA margin and RT margin using the MP modified offers and compensate with DAMAP to the smaller amount. Additionally, DAMAP uses adjusted DA MW and eligibility rules are evaluated to account for offer changes such as Econ Max/Econ Min, ramp rates, self-commit, etc.

Conventional DAMAP formulation can thus be described as in FIG. 5-22.

Or more specifically, $$\text{MAX}\left[\left(\int_0^{ADJ\_DA\_EN_i} \text{DA\_Offer\_Curve} - \int_0^{MAX(NXE_i, DFE\_T)} \text{DA\_Offer\_Curve}\right),\right.$$
$$\left.\left(\int_0^{ADJ\_DA\_EN_i} \text{RT\_Offer\_Curve} - \int_0^{MAX(NXE_i, DFE\_T)} \text{RT\_Offer\_Curve}\right)\right] - [$$
$$(ADJ\_DA\_EN_i - \text{MAX}(NXE_i, DFE\_T)) \times RT\_LMP\_EN]$$

The exemplary ECC model of the current disclosure introduces additional complications increasing the complication of the DAMAP evaluation as shown in FIG. 5-23: multiple configurations, each with its own offer curves; and additional decision point of RT commitment since a resource can be committed in a different configuration between DA and RT.

DAMAP for exemplary ECC model of the current disclosure will be developed based on FIG. 5-24, where the DA margin is evaluated using the offer curve associated with the DA committed configuration, and the RT margin is evaluated using the offer curve of the RT configuration, at each time the DA or RT commitment and dispatch decisions are made, and DAMAP will compensate for the smaller amount of the difference between DA margin and RT margin.

The DAMAP developed in section 5.3 not considering MP offer changes $$RT\ MWP\_PROD_i = (RT\ MW - DA\ MW) \times RT\ Price - (\int_0^{RTMW} \text{Offer\_Cost} - \int_0^{DAMW} \text{Offer\_Cost}))$$

will then be modified based on FIG. 5-24 to account for MP initiated offer changes during the detailed solution design phase. Other MWP calculations may also be adjusted as needed, and current practices such as adjusted DA MW and eligibility rules will be leveraged for ECC resources.

6. Pricing

ECC resources will be eligible to set price under ELMP. Similar ELMP logic currently used for non-ECC resources will be applied to the committed ECC configuration. An ECC configuration qualifies as an ELMP Fast Start resource if the application of the existing Fast Start qualification criteria are satisfied for the ECC plant, i.e., a configuration is started (from ALLOFF) within 60 minutes and has minimum run time of 1 hour or less. Since ECC models minimum run time at component level, the min run time will be mapped to configuration level by taking the maximum of all components in the configuration.

Most combined cycle resources have start-up and start-up notification time from ALLOFF and minimum run times greater than 1 hour. Many would not qualify as Fast Start Resources. Consequently, they would be setting prices like other non-Fast Start Resources. Typical ECC resource start-up and minimum run times are shown in FIG. 6-1.

7. List of Acronyms

The following is a non-exhaustive list of acronyms used in the current disclosure:
AGC—Automatic Generation Control
ALLOFF—The status where all components of the combined cycle resources are offline
CCCT—Combined Cycle Combustion Turbine
CCGT—Combined Cycle Gas Turbine
CMODE—Control Mode
CPnode—commercial pricing node
CROW—Control Room Operations Window
CT—combustion turbine
DA—Day-Ahead
DAMAP—Day Ahead Margin Assurance Payment
DB—duct burner
ECC—Enhanced Combined Cycle
ECCTT—Enhanced Combined Cycle Task Team
ELMP—Extended Locational Marginal Pricing
HE—Hour Ending
ICCP—Inter-Control Center Communications Protocol
LAC—Look-Ahead Commitment
LMP—Locational Marginal Pricing
MCS—MISO Communication System
MP—Market Participant
MW—megawatt
MWh—megawatt hours
MWP—make whole payment
OR—operating reserve
RAC—Reliability Assessment Commitment
RSG—Revenue Sufficiency Guarantee
RT—Real-Time
RTO—Real-Time Offer
RTORSGP—Real-Time Offer Revenue Sufficiency Guarantee Payment
SCUC—Security Constrained Unit Commitment
SE—State Estimator
ST—steam turbine
UDS—Unit Dispatch System
XML—Extensible Markup Language 8. Conclusion Having described the exemplary embodiments incorporating various inventions as claimed, it will be apparent that modifications may be made to the exemplary embodiments without departing from the scope of the inventions as claimed.

What is claimed is:

1. A method for operating a combined-cycle electrical power grid system that includes an electrical power grid, a plurality of power generation participants providing electrical power to the electrical power grid, and a plurality of consumers drawing electrical power from the electrical power grid, where at least a portion of the power generation participants are combined cycle participants that include a combination of different power generator types, the method comprising:
   accepting, from each of the combined cycle participants, combined cycle offers, at least one of the offers being for a plurality of valid combined cycle configurations, each of the combined cycle configurations being different and including (a) identification of one or more power generator types for the configuration, (b) usable power generation capacity for each of the one or more power generator types identified for the configuration, (c) operating characteristics of each of the one or more generator types identified for the configuration, and (d) cost for the configuration, wherein the combined cycle offers include resource level parameters that provide information pertaining to one or more transitions between two or more of the combined cycle participants;

selecting commitments from the combined cycle offers based upon, at least in part, the resource level parameters for transitioning between the valid combined cycle configurations, (c) the operating characteristics, and (d) the cost for each of the offered configurations, wherein a set of one or more power generator types of at least one of the offers is different from another set of power generator types of another of the offers; and controlling dispatch of electricity on the electrical power grid based upon the selected commitments, (a) the one or more identified power generator types, and (b) the one or more power generation capacities.

2. The method of claim 1, wherein the valid combined cycle configurations also include an all-off configuration.

3. The method of claim 1, wherein the combined cycle offers further include physical component identifications associated with the power generator type identifications and the method further includes tracking component on and off times to enforce minimum up time, minimum down time and maximum run time constraints.

4. The method of claim 1, wherein the set of valid combined cycle configurations includes one or more configurations with (e) indication of the presence of a duct burner (DB) to increase the power generation capacity of the configuration.

5. The method of claim 1, wherein each of the commitments indicates whether the respective participant wants to be on, and wherein the controlled dispatch identifies, responsive to at least one of the indications indicating that the respective participant does want to be on, an amount of power generation therefrom.

6. The method of claim 5, wherein the resource level parameters include transition validity indicators between respective pairs of valid combined cycle configurations, the transition validity indicators indicating whether a transition between the pair of valid combined cycle configurations is valid or not.

7. The method of claim 6, wherein the resource level parameters further include transition time, transition notification time and transition cost information for each respective pair of valid transitions.

8. The method of claim 7, wherein the method further includes controlling transitioning between the configurations based upon real-time (RT) market information.

9. A method for operating a combined-cycle electrical power grid system that includes an electrical power grid, a plurality of power generation participants providing electrical power to the electrical power grid, and a plurality of consumers drawing electrical power from the electrical power grid, where at least a portion of the power generation participants are combined cycle participants that include a combination of different power generator types, the method comprising:

accepting, from a plurality of combined cycle power generation participants, combined cycle offers, each being for a plurality of valid combined cycle configurations, each of the valid combined cycle configurations being different from one another and including identification of one or more power generator types for the configuration and the offers including at least three levels of parameter information pertaining to the valid combined cycle configurations, the three levels of parameter information including, (a) resource level parameters that describe transition information between the valid combined cycle configurations, (b) configuration level parameters that describe operating parameters for each of the valid combined cycle configurations; and (c) component level parameters that describe operating parameters for specific power generator components included in one or more of the valid combined cycle configurations;

selecting commitments from the combined cycle offers based upon, at least in part, the resource level parameters that provide information pertaining to one or more transitions between two or more of the combined cycle power generation participants, the configuration level parameters, a cost for each of the offered configurations, and the component level parameters; and controlling dispatch of electricity on the electrical power grid based upon the selected commitments.

10. The method of claim 9, wherein the resource level parameters include transition validity indicators between respective pairs of valid combined cycle configurations, the transition validity indicators indicating whether a transition between the pair of valid combined cycle configurations is valid or not.

11. The method of claim 10, wherein the resource level parameters further include transition time, transition notification time and transition cost information for each respective pair of valid transitions.

12. The method of claim 11, wherein the method further includes controlling transitioning between the configurations based upon real-time (RT) market information.

13. The method of claim 10, wherein the method further includes controlling transitioning between the configurations based, at least in part, upon the resource level parameters and upon market information.

14. The method of claim 10, wherein the selecting and controlling steps do not specify specific power generator components, thereby allowing combined cycle power generation participants to select specific power generator components for the valid combined cycle configurations.

15. The method of claim 10, wherein the method further includes the step of receiving telemetry information from combined cycle power generation participants, the telemetry information including (i) information indicating the current combined cycle configuration in which the combined cycle power generation participant is operating, and (ii) information pertaining to whether the combined cycle power generation participant is transitioning between combined cycle configurations.

16. The method of claim 10, wherein the method further includes arranging settlement payment to the combined cycle power generation participants, wherein the settlement payment takes into account the combined cycle configurations in which the combined cycle power generation participants were operating in a given time period.

17. The method of claim 16, wherein the settlement payment further takes into account real-time (RT) changes in committed combined cycle configurations for the combined cycle power generation participants.

18. The method of claim 17, wherein the settlement payment further takes into account day-ahead (DA) and RT commitments due to RT changes in the committed combined cycle configurations.

19. The method of claim 16, wherein the settlement payment further takes into account transition costs between combined cycle configurations.

20. The method of claim 1, wherein the operating characteristics include at least one of a minimum offered output, a maximum offered output, or a ramp rate.

* * * * *